United States Patent
Kim et al.

(10) Patent No.: US 11,463,486 B2
(45) Date of Patent: Oct. 4, 2022

(54) ELECTRONIC DEVICE AND METHOD FOR PROVIDING INFORMATION IN VIRTUAL REALITY

(71) Applicant: Samsung Electronics Co., Ltd., Suwon-si (KR)

(72) Inventors: Minjung Kim, Suwon-si (KR); Woojun Choi, Suwon-si (KR); Ilhoe Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/272,275

(22) PCT Filed: Aug. 13, 2019

(86) PCT No.: PCT/KR2019/010286
§ 371 (c)(1),
(2) Date: Feb. 26, 2021

(87) PCT Pub. No.: WO2020/045862
PCT Pub. Date: Mar. 5, 2020

(65) Prior Publication Data
US 2021/0258354 A1 Aug. 19, 2021

(30) Foreign Application Priority Data

Aug. 27, 2018 (KR) .................. 10-2018-0100299

(51) Int. Cl.
*G06F 15/173* (2006.01)
*H04L 65/1016* (2022.01)
(Continued)

(52) U.S. Cl.
CPC ...... *H04L 65/1016* (2013.01); *G02B 27/0093* (2013.01); *G06F 3/011* (2013.01);
(Continued)

(58) Field of Classification Search
CPC . H04L 65/1016; H04L 65/1006; H04L 67/24; H04L 65/1063; H04L 65/604;
(Continued)

(56) References Cited

U.S. PATENT DOCUMENTS 10,802,683 B1 * 10/2020 Griffin .................. H04L 67/24
10,963,648 B1 * 3/2021 Bill ..................... G06F 40/157
(Continued)

FOREIGN PATENT DOCUMENTS

KR 10-2015-0082120 A 7/2015
KR 10-2016-0133230 A 11/2016
(Continued)

OTHER PUBLICATIONS

"Samsung PhoneCast VR Beta", https://www.oculus.com/experiences/gear-vr/1239896026125279/?locale=en_US, 2017, 1 page.
(Continued)

*Primary Examiner* — Karen C Tang

(57) ABSTRACT

According to various embodiments of the present invention, an electronic device may comprise an IMS framework for communicating with an IMS server, a display, a memory, and a processor, wherein the processor is configured to: control the display to display a VR image in response to an activation state of a virtual reality mode; receive presence information including information on an activation state of the VR mode of at least one external electronic device from the IMS server; include, in the VR image, the received presence information about the at least one external electronic device, using a 3D application, and render the VR image; and control the display to display the rendered VR image including the presence information about the at least one external electronic device. Various other embodiments, in addition to various embodiments disclosed in the present invention, are possible.

15 Claims, 14 Drawing Sheets

(51) Int. Cl.
*H04N 13/194* (2018.01)
*G02B 27/00* (2006.01)
*G06F 3/01* (2006.01)
*H04L 65/1104* (2022.01)
*H04L 67/54* (2022.01)
*G06F 15/16* (2006.01)

(52) U.S. Cl.
CPC .......... *G06F 3/013* (2013.01); *H04L 65/1104* (2022.05); *H04L 67/54* (2022.05); *H04N 13/194* (2018.05)

(58) Field of Classification Search
CPC ... G02B 27/0093; G02B 27/017; G06F 3/011; G06F 3/013; H04N 13/194; H04N 13/106; H04N 7/14; H04N 21/63; H04N 21/81; H04N 7/147; H04N 21/816
USPC .................................................. 709/227, 224
See application file for complete search history.

(56) References Cited

U.S. PATENT DOCUMENTS

| | | | | |
|---|---|---|---|---|
| 2009/0187833 | A1* | 7/2009 | Cheng .................... | G06Q 10/10 715/757 |
| 2013/0117377 | A1* | 5/2013 | Miller ................ | H04L 65/4015 709/205 |
| 2016/0335801 | A1 | 11/2016 | Yoon et al. | |
| 2016/0337612 | A1 | 11/2016 | Im et al. | |
| 2017/0126872 | A1 | 5/2017 | Cha et al. | |
| 2017/0326457 | A1* | 11/2017 | Tilton ..................... | A63F 13/79 |
| 2017/0374173 | A1* | 12/2017 | Nassirzadeh ......... | G06T 19/003 |
| 2018/0104580 | A1* | 4/2018 | Humadi ................. | A63F 13/35 |
| 2018/0205773 | A1 | 7/2018 | Miller | |
| 2021/0074068 | A1* | 3/2021 | Spivack ................ | G06T 19/006 |
| 2021/0232288 | A1* | 7/2021 | Deliz Centeno ... | G02B 27/0093 |
| 2021/0400094 | A1* | 12/2021 | Miller .................... | A63F 13/92 |

FOREIGN PATENT DOCUMENTS

| | | |
|---|---|---|
| KR | 10-2018-0017736 A | 2/2018 |
| KR | 10-1842657 B1 | 3/2018 |

OTHER PUBLICATIONS

International Search Report dated Nov. 25, 2019 in connection with International Patent Application No. PCT/KR2019/010286, 2 pages.
Written Opinion of the International Searching Authority dated Nov. 25, 2019 in connection with International Patent Application No. PCT/KR2019/010286, 4 pages.

* cited by examiner

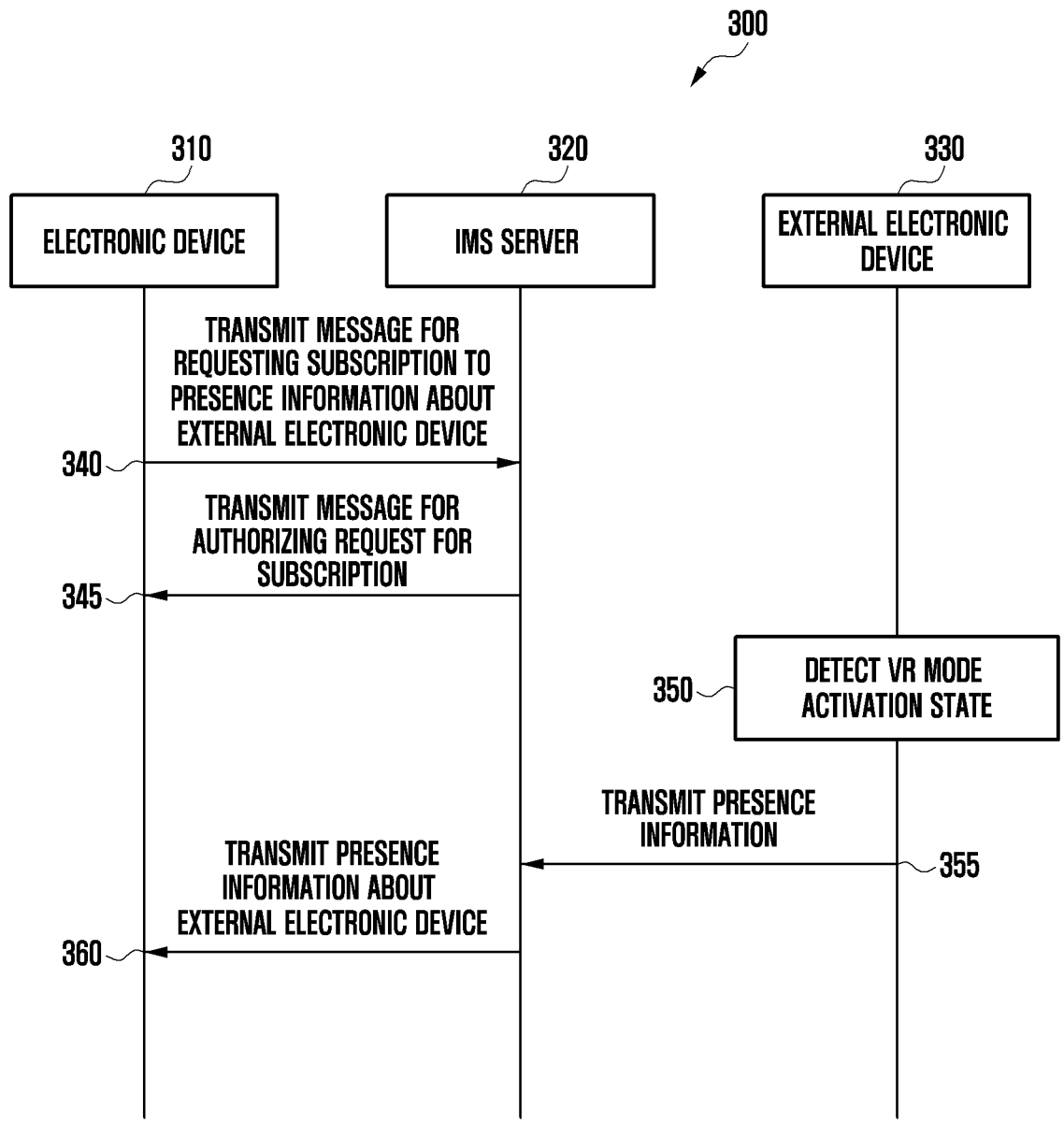

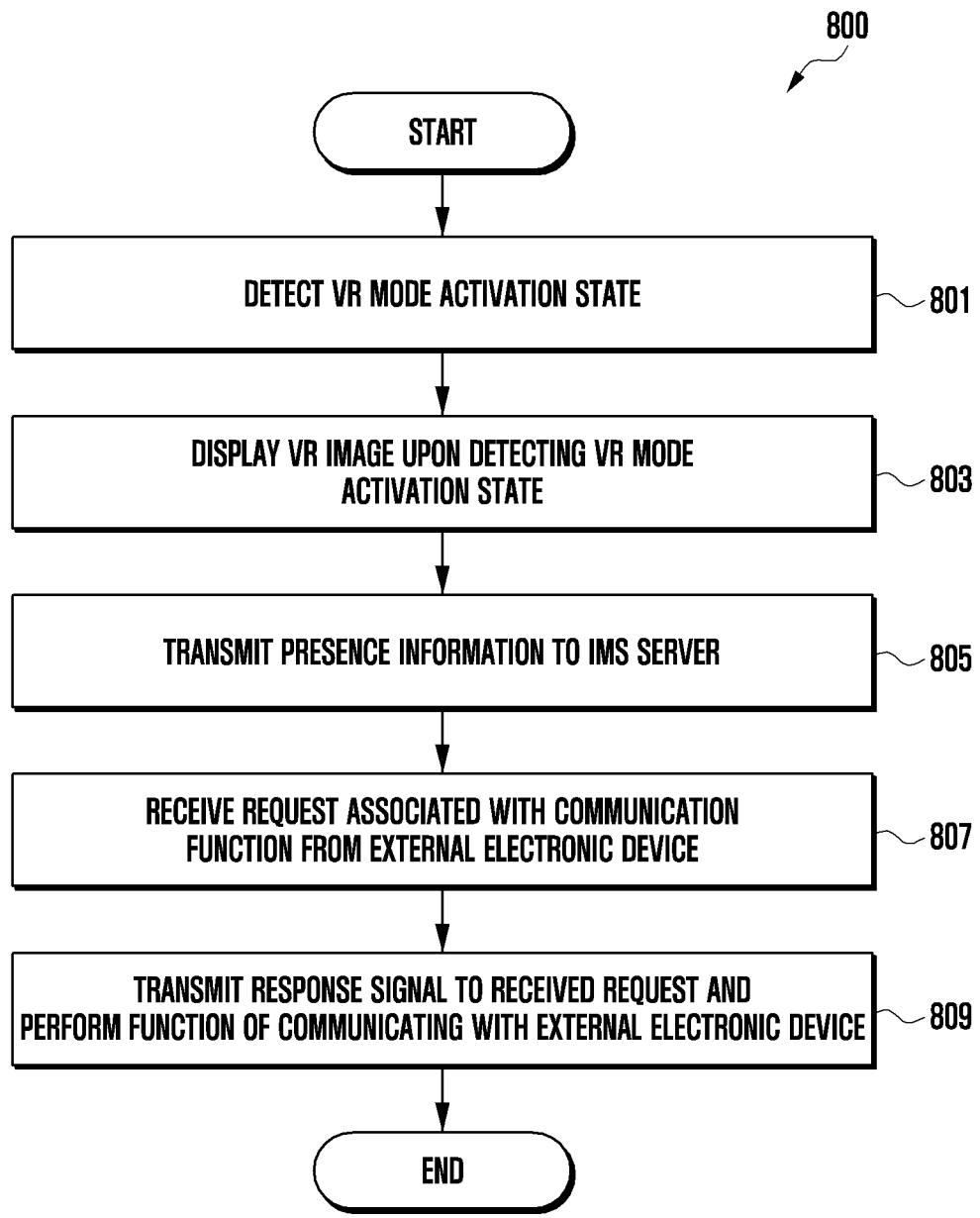

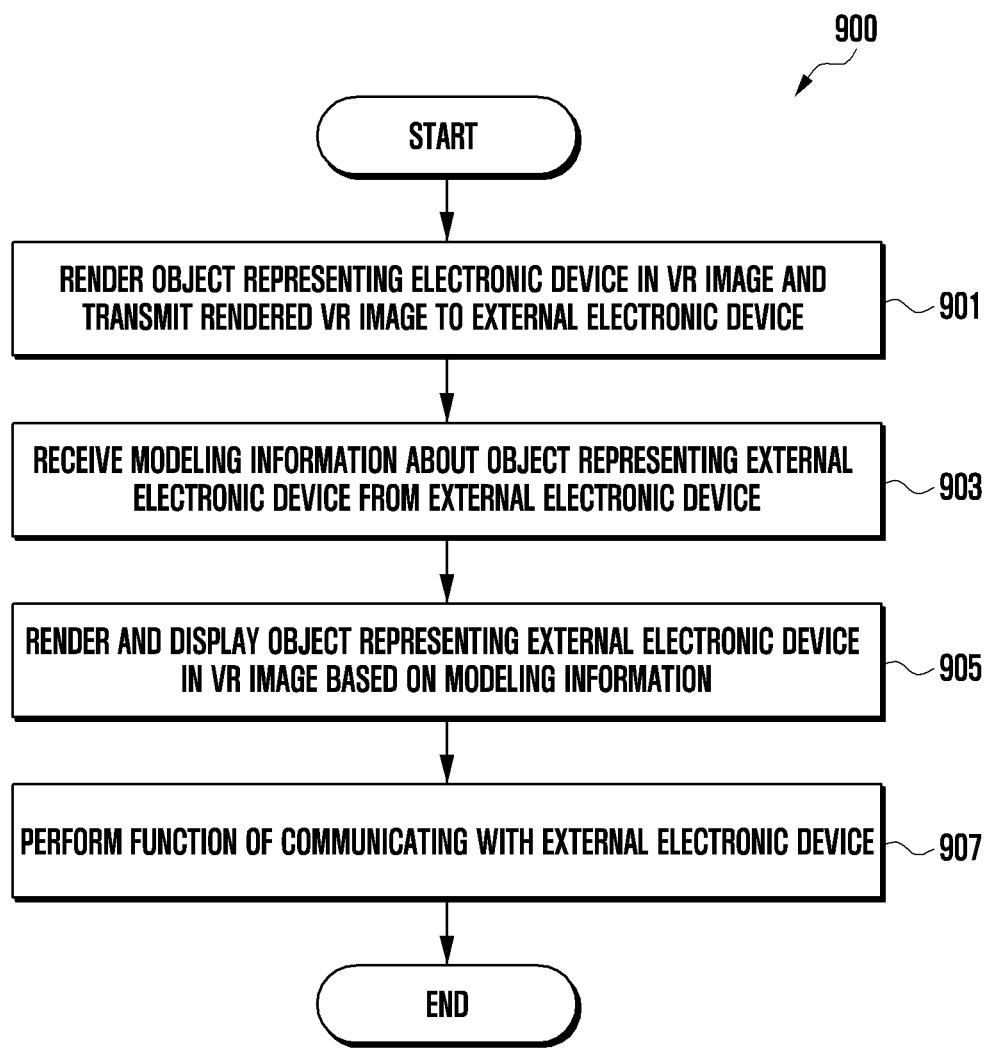

ELECTRONIC DEVICE AND METHOD FOR PROVIDING INFORMATION IN VIRTUAL REALITY

CROSS-REFERENCE TO RELATED APPLICATIONS

This application is a 371 of International Application No. PCT/KR2019/010286 filed on Aug. 13, 2019, which claims priority to Korean Patent Application No. 10-2018-0100299 filed on Aug. 27, 2018, the disclosures of which are herein incorporated by reference in their entirety.

BACKGROUND

1. Field

Various embodiments of the disclosure relate to an electronic device and a method for providing information in virtual reality.

2. Description of Related Art

There has recently been development of wearable electronic devices that can be directly worn on human bodies. Wearable electronic devices may be configured in various types (for example, head-mounted devices (HMD), smart watches, and wristbands) such that they can be attached to/detached from parts of human bodies or garments.

Particularly, in the case of a head-mounted device, a display may be disposed in front of the user's eyes so as to provide the user with a super-large screen, and the screen moves together according to the user's movement, thereby providing a realistic virtual world.

In the case of an electronic device, it is impossible to perform a communication function (for example, telephone function) with a counterpart electronic device by using a mobile communication network (for example, VoLTE or ViLTE) while a VR device is worn. If the communication function (for example, telephone function) with the counterpart electronic device is to be performed while the VR device is worn, it may be difficult to confirm whether or not the user of the counterpart electronic device is wearing a VR device. As a result, it may be impossible to provide a user interface in view of the VR device wearing state.

If a VR mode is activated, an electronic device according to various embodiments of the disclosure may use an IMS-based network configured to provide information related to a VR device (hereinafter, referred to as presence information) so as to receive presence information regarding the counterpart electronic device. Based on the presence information received via the IMS-based network, the electronic device may perform a function of communicating with the counterpart electronic device while the VR mode remains activated.

SUMMARY

An electronic device according to various embodiments of the disclosure may include: an IMS framework configured to communicate with an IMS server; a display; a memory; and a processor. The processor may be configured to: control the display to display a VR image in response to a virtual reality (VR) mode activation state; receive presence information including information about the VR mode activation state of at least one external electronic device from the IMS server; render the VR image to include the received presence information about the at least one external electronic device using a 3D application; and control the display to display the rendered VR image including the presence information about the at least one external electronic device.

According to various embodiments of the disclosure, a method for providing information, by an electronic device, in virtual reality may include the operations of: displaying a virtual reality (VR) image on a display in response to a VR mode activation state; receiving presence information including information about the VR mode activation state about at least one external electronic device from an IMS server; rendering the VR image to include the received presence information about the at least one external electronic device using a 3D application; and displaying the rendered VR image including the presence information about the at least one external electronic device on the display.

An electronic device according to various embodiments of the disclosure may perform a function of communicating with a counterpart electronic device via an IMS-based network while a VR mode remains activated. The electronic device may receive presence information regarding the VR mode activation state of the counterpart electronic device via the IMS-based network, and may thus provide the user with an appropriate user interface based on the presence information.

BRIEF DESCRIPTION OF THE DRAWINGS

FIG. 3 is a diagram illustrating signal flow between an electronic device, an IMS server, and an external electronic device according to various embodiments of the disclosure;

FIG. 8 is a flowchart illustrating a method for transmitting presence information about an electronic device according to various embodiments of the disclosure;

FIG. 9 is a flowchart illustrating a method for performing a function of communicating with an external electronic device in a VR mode according to various embodiments of the disclosure;

DETAILED DESCRIPTION

Figure 1:
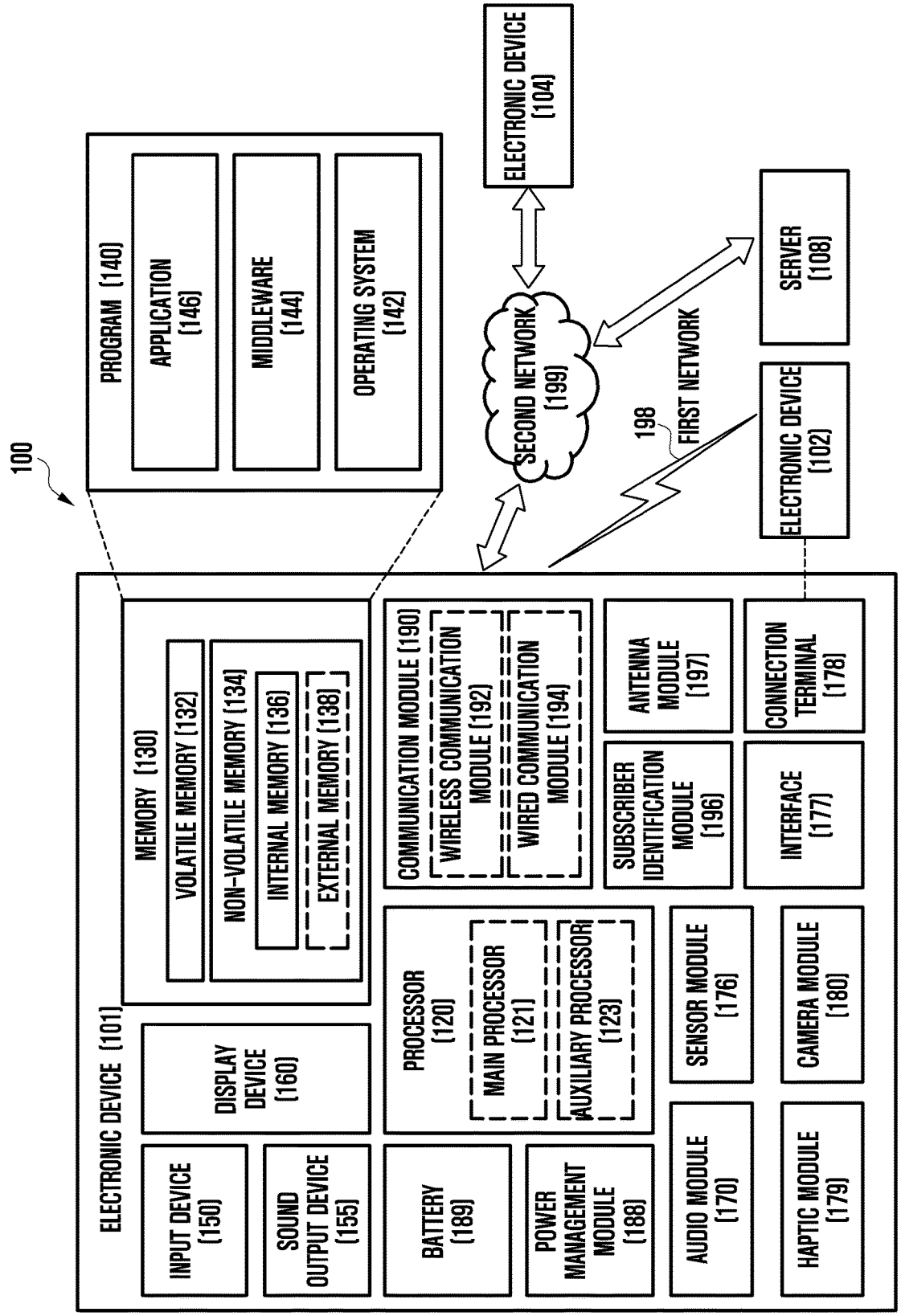
FIG. 1 is a block diagram illustrating an electronic device for providing information in virtual reality in a network environment according to various embodiments.

FIG. 1 is a block diagram illustrating an electronic device for providing information in virtual reality in a network environment according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may be formed in a conductor or a conductive pattern. According to an embodiment, the antenna module 197 may further include other components (e.g., a radio frequency integrated circuit (RFIC)) in addition to the conductor or the conductive pattern. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
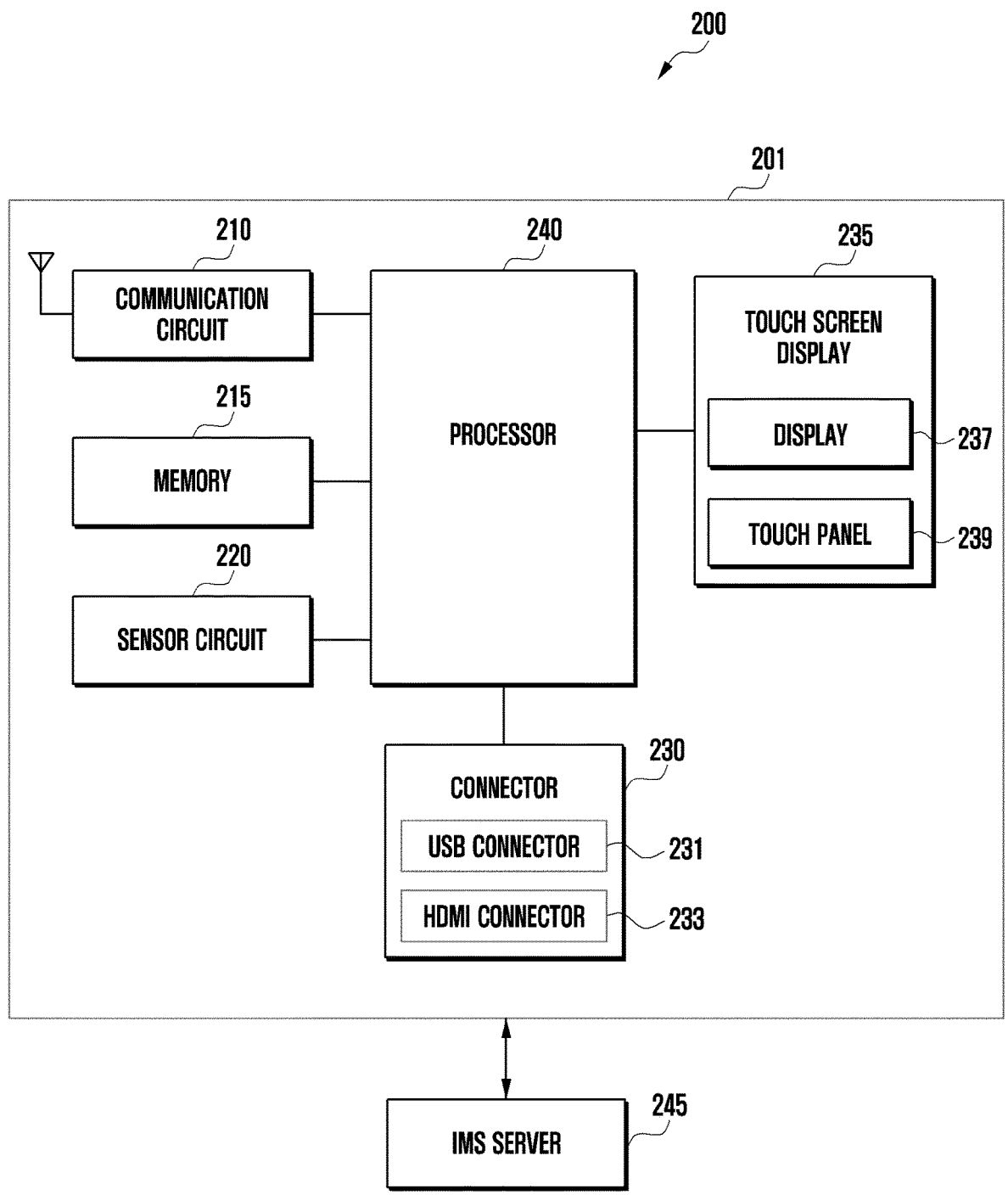
FIG. 2A is a block diagram illustrating an electronic device and an IMS server according to various embodiments.

FIG. 2A is a block diagram 200 illustrating an electronic device 201 and an IMS server 245 according to various embodiments.

Referring to FIG. 2A, the electronic device 201 (e.g., the electronic device 101 of FIG. 1) may include a communication circuit 210 (e.g., the communication module 190 of FIG. 1), a memory 215 (e.g., the memory 130 of FIG. 1), a sensor circuit 220 (e.g., the sensor module 176 of FIG. 1), a connector 230 (e.g., the connection terminal 178 of FIG. 1), a touchscreen display 235 (e.g., the display device 160 of FIG. 1), and a processor 240 (e.g., the processor 120 of FIG. 1).

In an embodiment, the communication circuit 210 may be connected to a network via wireless and/or wired communication to communicate with an external electronic device (e.g., the electronic device 102 or 104 or the server 108 of FIG. 1).

In an embodiment, the communication circuit 210 may electrically connect the electronic device 201 and a VR device (not shown, e.g., a VR device 251 of FIG. 2B) using wireless and/or wired communication to perform data transmission and reception.

In an embodiment, the communication circuit 210 may connect the electronic device 201 and an IP multimedia subsystem (IMS) server 245 to perform transmission and reception of presence information. For example, the presence information may include information about a VR mode activation state. For example, the information about the VR mode activation state may include information about a state in which the VR device (not shown, e.g., the VR device 251 of FIG. 2B) is connected, information about a state in which a user wears the VR device, or a state in which a screen is rendered in a 3D VR mode and is output.

In an embodiment, the memory 215 may store commands (or instructions), an algorithm, a program, or an application to control the overall operation of the electronic device 201.

In an embodiment, the memory 215 may store a control operation of the electronic device 201 according to whether a VR mode is activated, for example, whether the VR device is connected and/or whether the VR device is worn.

In an embodiment, the memory 215 may store an animation to be applied to objects representing the electronic device 201 and the external electronic device based on context information when communication between the electronic device 201 and the external electronic device is performed.

In an embodiment, the sensor circuit 220 may detect an operating state inside and outside the electronic device 201 and may transmit detected information to the processor 240. For example, the sensor circuit 220 may include at least one of an accelerometer, a geomagnetic sensor, a gyro sensor, a magnetic sensor, a proximity sensor, a gesture sensor, a grip sensor, or a biometric sensor.

In an embodiment, the sensor circuit 220, for example, the proximity sensor or the grip sensor, may detect at least one of IR recognition, pressure recognition, and a variance in capacitance (or permittivity) according to wearing of the VR device and may transmit the same to the processor 240.

In an embodiment, the sensor circuit 220, for example, the accelerometer, the geomagnetic sensor, and the gyro sensor, may detect the movement of the head of a user wearing the VR device 251 and may transmit the same to the processor 240.

In an embodiment, the connector 230 may physically connect the electronic device 201 and the VR device. For example, the connector 230 may include a USB connector 231 and an HDMI connector 233.

In an embodiment, the touchscreen display 235 may be configured in an integrated form including a display 237 and a touch panel 239.

In an embodiment, the touchscreen display 235 may display various screens according to operations of transmitting and receiving presence information using the IMS server 245 under control of the processor 240.

In an embodiment, the touchscreen display 235 may display various screens according to use of the VR device 251 under control of the processor 240. For example, when the VR mode activation state is detected (e.g., a state in which the VR device is connected through the communication circuit 210 or connector 230 is detected, a state in which the user wears the VR device is detected through the sensor circuit 220, and/or a state in which a screen is rendered in the 3D VR mode and is output to the display is detected), the touchscreen display 235 may display a VR image under control of the processor 240. For example, the touchscreen display 235 may divide one image into two images (e.g., a left image and a right image) and may display the two images under control of the processor 240.

In an embodiment, the touchscreen display 235 may display a VR image in which presence information received from the IMS server 245 is rendered under control of the processor 240. The touchscreen display 235 may display a VR image in which an object representing an external electronic device is rendered under control of the processor 240. The touchscreen display 235 may display a VR image in which a predefined animation is applied to an object representing the electronic device 201 or the external electronic device based on received context information under control of the processor 240.

In an embodiment, the touchscreen display 235 may display various screens according to execution of a function of communicating with the external electronic device under control of the processor 240.

In an embodiment, the processor 240 may control the overall operation of the electronic device 201 and signal flow between internal components of the electronic device 201, may perform data processing, and may control power supply from a battery (e.g., the battery of FIG. 189) to the components.

In an embodiment, the processor 240 may transmit a message for requesting subscription to presence information about the external electronic device to the IMS server 245. The processor 240 may receive a message for authorizing the request for the subscription from the IMS server 245 in response to the request for the subscription.

In an embodiment, the processor 240 may display a VR image upon detecting the VR mode activation state. The processor 240 may receive presence information about at least one external electronic device from the IMS server 245. The processor 240 may display the received presence information on the VR image. The processor 240 may perform a function of communicating with the at least one external device based on the displayed presence information. For example, the communication function of communicating may include at least one of a video call and a game.

In an embodiment, when a function of communicating with an external electronic device, for example, a signal for requesting a video call, input by a user is detected, the processor 240 may transmit the detected signal for requesting the video call to the external electronic device through the communication circuit 210. When receiving a response signal (e.g., an acceptance signal) to the video call from the external electronic device, the processor 240 may transmit a VR image in which an object representing the electronic device 201 is rendered to the external electronic device. The processor 240 may receive information about an object (e.g., a 3D avatar) representing the external electronic device from the external electronic device. The processor 240 may include and render the received object representing the external electronic device in the VR image.

In an embodiment, the processor 240 may receive context information about the external electronic device from the external electronic device. The processor 240 may render and display a VR image based on the context information.

In an embodiment, when a 2D application is executed, the processor 240 may store a screen of the 2D application in the memory 215. The processor 240 may execute a program, for example, a 3D application or a VR rendering application, may read the screen of the 2D application from the memory 215, may render the VR image to include the read screen, and may display the VR image on the display 237.

In an embodiment, the processor 240 may render a VR image of an area corresponding to the user's gaze and may display the VR image on the display 237 based on the user's gaze and/or head movement tracked by the sensor circuit 220 (e.g., the accelerometer and/or the gyro sensor). The processor 240 may render a screen of a function corresponding to a user input detected by the VR device 251 in the VR image and may display the VR image on the display 237.

In an embodiment, the external electronic device may include the same components as those of the electronic device 201 described above.

In an embodiment, the IMS server 245 may transmit and receive information about the electronic device 201 and presence information based on an IMS protocol supporting communication between the electronic device 201 and the IMS server 245. The IMS protocol may include a session initiation protocol (SIP).

In an embodiment, the IMS server 245 may manage a contact list of at least one registered electronic device. For example, the IMS server 245 may manage a contact list of at least one registered electronic device, such as the electronic device 201 and the external electronic device, and may manage information about whether to subscribe to presence information about a contact included in each contact list.

Figure 2B:
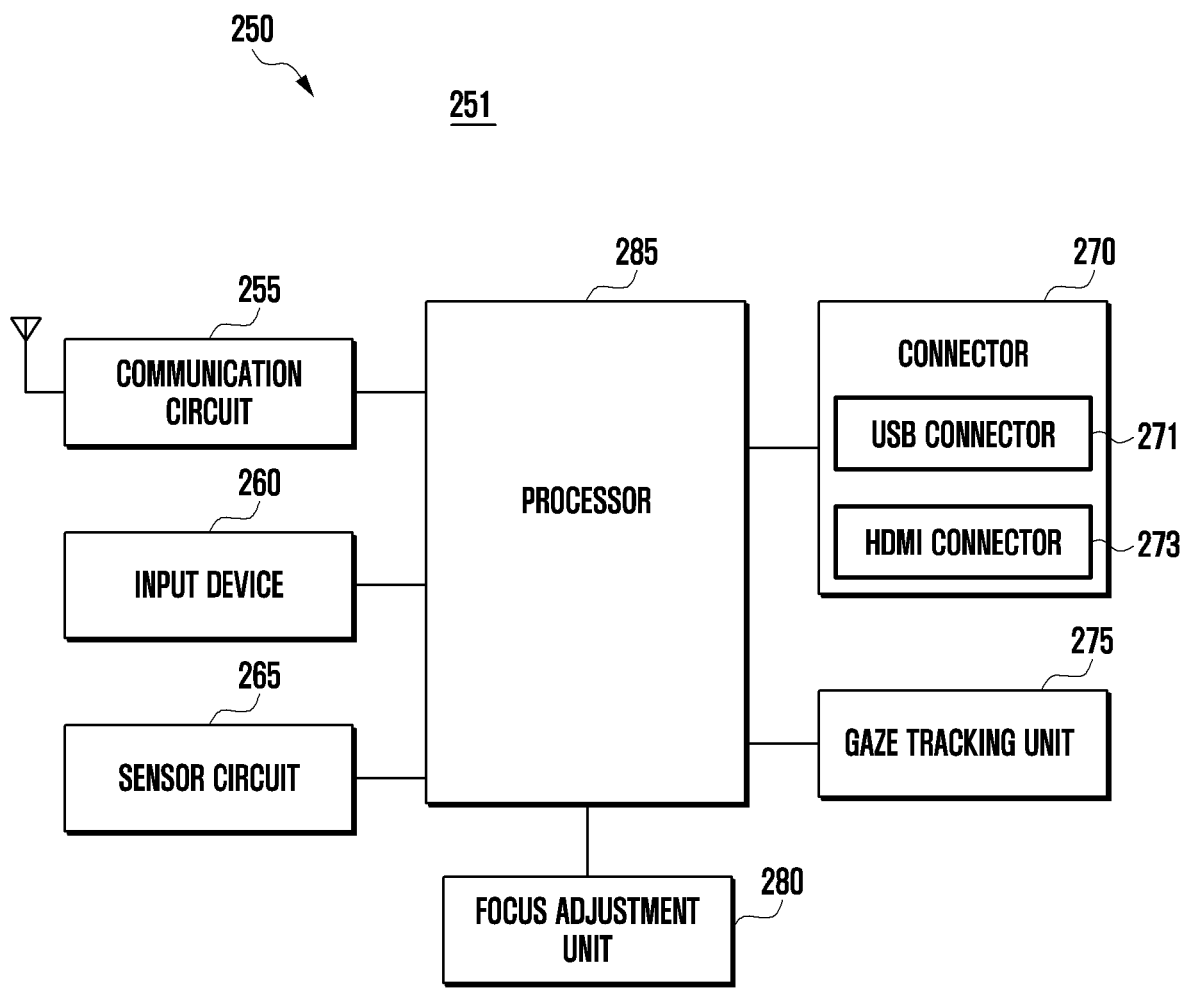
FIG. 2B is a block diagram illustrating a VR device according to various embodiments.

FIG. 2B is a block diagram 250 illustrating a VR device 251 according to various embodiments.

Referring to FIG. 2B, the VR device 251 may include a communication circuit 255, an input device 260, a sensor circuit 265, a connector 270, a gaze tracking unit 275, a focus adjustment unit 280, and a processor 285.

In an embodiment, the communication circuit 255 may electrically connect the VR device 251 with the electronic device 201 using wireless and/or wired communication to transmit and receive data, for example, presence information.

In an embodiment, the input device 260 may include a touch pad and a button. The touch pad may recognize a touch input using at least one of, for example, a capacitive type, a pressure-sensitive type, an infrared type, or an ultrasonic type.

In an embodiment, the sensor circuit 265 may measure a physical quantity or may detect an operating state of the VR device 251 and may convert measured or detected information into an electrical signal. The sensor circuit 265 may include at least one of, for example, an accelerometer, a geomagnetic sensor, a gyro sensor, a magnetic sensor, a proximity sensor, a gesture sensor, a grip sensor, and a biometric sensor.

In an embodiment, the VR device 251 may transmit sensor data sensed by the proximity sensor or the grip sensor to the electronic device 201. For example, the sensor data may include at least one of IR recognition, pressure recognition, and a variance in capacitance (or permittivity). Further, the VR device 251 may transmit sensor data sensed by the accelerometer, the geomagnetic sensor, and the gyro sensor to the electronic device 201.

In an embodiment, the connector 270 may include an electrical connection unit of the VR device 251, for example, a USB connector 271 for connecting to a USB cable interface (e.g., a USB circuit and a USB terminal) and/or an HDMI connector 273 for connecting to a HDMI cable interface (e.g., an HDMI circuit and an HDMI terminal).

In an embodiment, the gaze tracking unit 275 may track the gaze of a user of the electronic device 201. The gaze tracking unit 275 may further include a micro camera (not shown) for tracking a gaze.

In an embodiment, the focus adjustment unit 280 may measure the inter-pupil distance (IPD) of the user and may adjust the distance of a lens and the position of the display 237 of the electronic device 201 so that the user may enjoy an image suitable for the user's sight.

In an embodiment, the processor 285 may control the overall operation of the VR device 251 and signal flow between internal components of the VR device 251 and may perform data processing.

In various embodiments, the VR device 251 of FIG. 2B may operate independently (in a stand-alone manner) and may further include, although not shown, a display and a memory. For example, when the VR device 251 operates independently, the processor 285 may display a VR image on the display upon detecting a VR mode activation state. The processor 285 may render the VR image to include presence information received from an IMS server and may output the rendered VR image to the display.

FIG. 3 is a diagram 300 illustrating signal flow between an electronic device 310, an IMS server 320, and an external electronic device 330 according to various embodiments of the disclosure.

In an embodiment, although not shown in FIG. 3, before operation 340, at least one electronic device (e.g., the electronic device 310 and the external electronic device 330) may be registered in the IMS server 320. For example, when at least one electronic device is connected to an IMS-based service, information about the at least one electronic device may be registered in the IMS server 320. For example, the at least one electronic device may transmit the information about the at least one electronic device to the IMS server 320 through a SIP register method. For example, the information about the at least one electronic device may include a user ID, a phone number, an email address, or the like.

Referring to FIG. 3, in operation 340, the electronic device 310 (e.g., the electronic device 201 of FIG. 2A) may transmit a message for requesting subscription to presence information about the external electronic device 330 to the IMS server 320 by a session initiation protocol (SIP) SUBSCRIBE method.

In an embodiment, the presence information may include information about a VR mode activation state of the external electronic device 330. However, the presence information is not limited to this example and may include at least one of position information about a user of the external electronic device 330, a communication state (e.g., an online or offline state), or a content sharing state.

In an embodiment, the VR mode activation state may include at least one of a state in which a VR device is connected, a state in which the user wears a VR device, or a state in which a screen is rendered in a 3D VR mode and is output to a display. The 3D VR mode may include a mode in which a screen is divided into areas corresponding to right and left eyes and a 3D screen corresponding to each eye is rendered.

In the following embodiments, it is assumed that the presence information is a VR mode activation state, for example, information about a state in which the VR device is worn.

In an embodiment, the electronic device 310 may display a user interface for setting whether to receive presence information about a specific contact on a display (e.g., the display 237 of FIG. 2A). For example, the user interface may include a screen displaying a contact list including at least one contact. For example, the contact list may include an item for setting whether to receive presence information about each of the at least one contact. For example, the item may have a toggle function and may be controlled to be on/off according to selection of the item, thereby setting whether to subscribe to (e.g., to receive)/unsubscribe from (e.g., not to receive) the presence information (e.g., information about a state in which a VR device is worn) about the contact.

In an embodiment, when it is set to subscribe to the presence information about the at least one contact (e.g., when an item provided for the contact is set to 'ON'), the electronic device 310 may transmit a message for requesting subscription to the presence information about the contact to the IMS server 320.

In an embodiment, when receiving the message for requesting the subscription to the presence information about the contact, for example, the external electronic device 330, from the electronic device 310, the IMS server 320 may transmit a message for authorizing the request for the subscription (e.g., a SIP 200 OK message) to the electronic device 310 in operation 345.

In an embodiment, the IMS server 320 may manage a contact list of the at least one registered electronic device. For example, the IMS server 320 may manage a contact list of at least one registered electronic device, such as the electronic device 310 and the external electronic device 330, and may manage information about whether to subscribe to presence information about a corresponding contact included in each contact list.

In an embodiment, in operation 350, the external electronic device 330 may detect the VR mode activation state. The VR mode activation state may include a state in which the VR device is connected, a state in which the user wears the VR device, and/or a state in which a screen is rendered in the 3D VR mode. For example, the external electronic device 330 may detect connection of the VR device through a connector (e.g., the connector 230 of FIG. 2A), for example, the USB connector 231 or the HDMI connector 233. The external electronic device 330 may detect at least one of IR recognition, pressure recognition, and a variance in capacitance (or permittivity) according to wearing of the VR device through a sensor circuit (e.g., the sensor circuit 220 of FIG. 2A), for example, a proximity sensor, and may detect a state in which a VR device is worn based on the detected one. The external electronic device 330 may detect a state in which a screen is rendered in the 3D VR mode and is output to the display. The 3D VR mode may include a mode in which a screen is divided into areas corresponding to right and left eyes and a 3D screen corresponding to each eye is rendered.

In an embodiment, when the VR mode is activated, the external electronic device 330 may transmit the presence information to the IMS server 320 through a SIP PUBLISH method in operation 355.

In an embodiment, in operation 360, the IMS server 320 may transmit the presence information about the external electronic device 330 to the electronic device 310 through a SIP NOTIFY method.

In an embodiment, the electronic device 310 may perform a function of communicating with the external electronic device 330 based on the presence information about the external electronic device 330 received from the IMS server 320. For example, the function of communicating may include at least one of a video call or a game in VR.

Although FIG. 3 according to an embodiment shows that presence information about one external electronic device 330 is received for convenience of description, the disclosure is not limited thereto, and the electronic device 310 may receive pieces of presence information about a plurality of external electronic devices from the IMS server 320 according to a subscription request for receiving the pieces of presence information about the plurality of external electronic devices.

The operation of the electronic device 310 according to various embodiments will be described with reference to FIG. 4, FIG. 6, FIG. 7A, FIG. 7B, and FIG. 9.

The operation of the external electronic device 330 according to various embodiments will be described with reference to FIG. 5 and FIG. 8.

Figure 4:
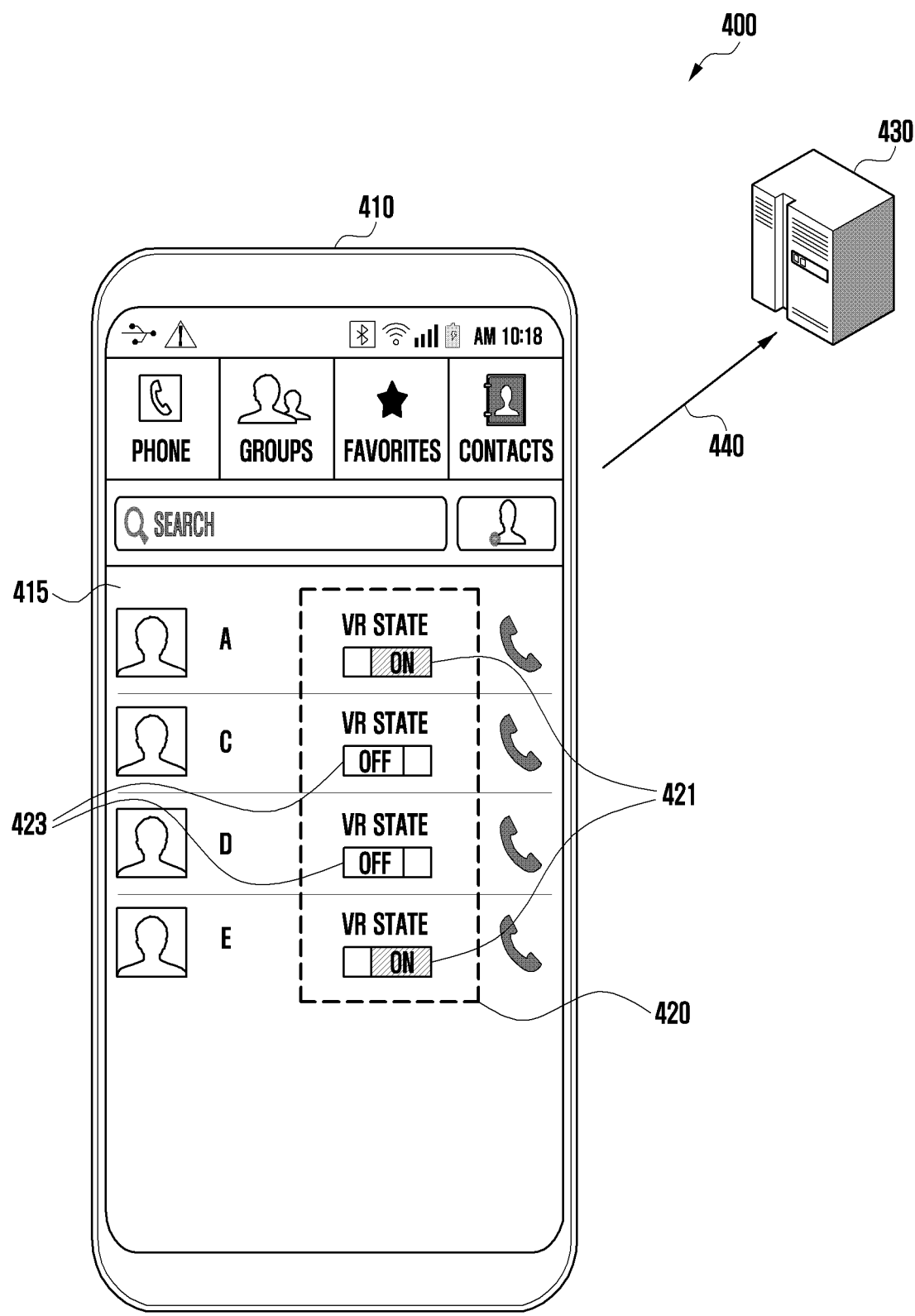
FIG. 4 is a diagram illustrating a method for subscribing to presence information about an external electronic device according to various embodiments of the disclosure.

FIG. 4 is a diagram 400 illustrating a method for subscribing to presence information about an external electronic device according to various embodiments of the disclosure.

In an embodiment, an electronic device 410 (e.g., the processor 240) may display a contact list 415 including at least one contact on a display (e.g., the display 237 of FIG. 2A) to set whether to subscribe to presence information about a user of at least one external electronic device, for example, a VR mode activation state (e.g., a state in which a VR device is connected, a state in which the user wears a VR device, or a state in which a screen is rendered in a 3D VR mode).

For example, the contact list 415 may include at least one of a contact stored in a phonebook in the electronic device 410 and a contact synchronized with a web server (e.g., Google™, Facebook™, Twitter™, or the like). The contact list 415 may be displayed when an application (e.g., a contact application or a phone application) associated with a contact is executed.

In an embodiment, the electronic device 410 (e.g., the processor 240) may set whether to subscribe to, for example, receive, presence information about each of the at least one contact in the contact list 415. For example, the contact list may include contacts A, C, D, and E. In addition, the contact list may include an item 420 for setting whether to receive the presence information about each contact, for example, a VR mode activation state (e.g., a state in which a VR device is connected, a state in which a VR device is worn, or a state in which a screen is rendered in a 3D VR mode and is output to the display). The electronic device 410 (e.g., the processor 240) may set whether to receive (e.g., 'ON')/not to receive (e.g., 'OFF') the presence information about each contact through the item 420. For example, when items 420 for contacts A and E are set to 'ON' (421) and items 420 for contacts C and D are set to 'OFF' (423), the electronic device 410 (e.g., the processor 240) may transmit (440) a message for requesting subscription to pieces of presence information about contacts A and E to the IMS server 430 (e.g., the IMS server 320 of FIG. 3).

In an embodiment, the IMS server 430 may manage information associated with subscription to the pieces of presence information about contacts A and E requested by the electronic device 410 (e.g., the processor 240).

Figure 5:
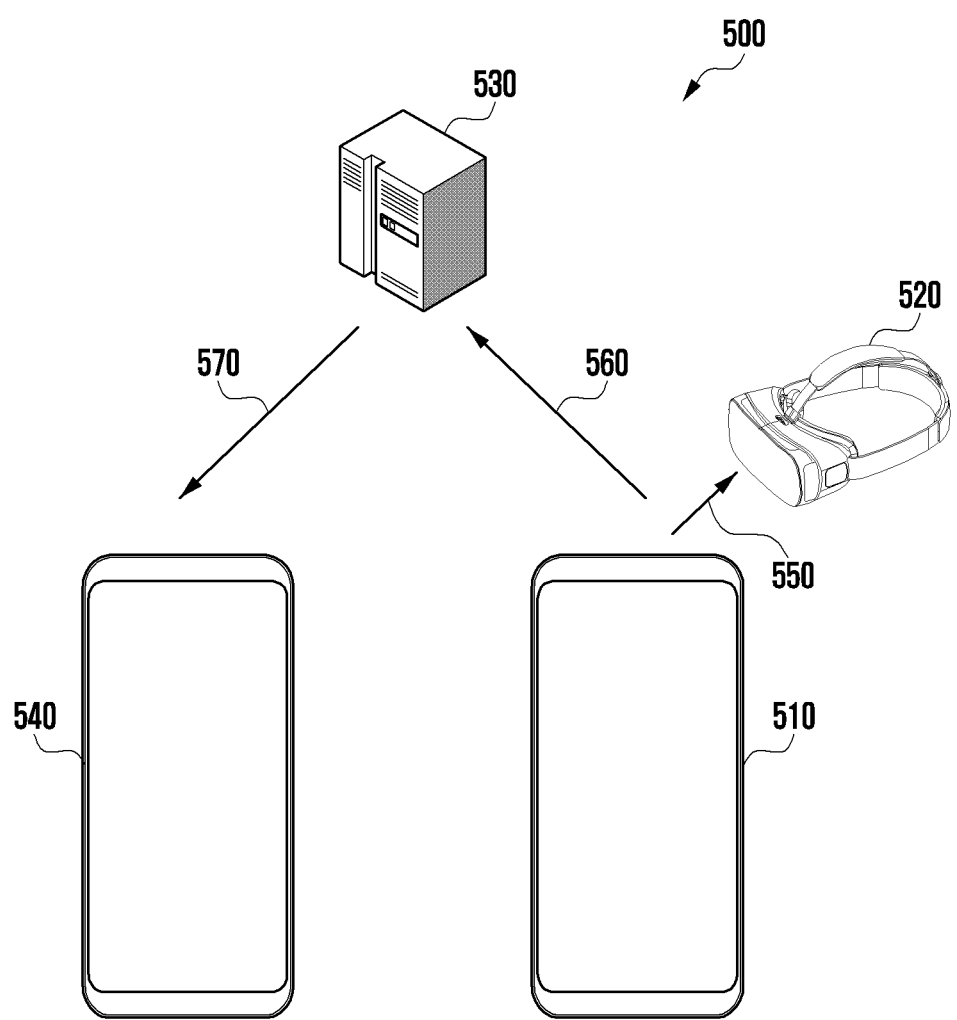
FIG. 5 is a diagram illustrating a method for transmitting presence information about an electronic device according to various embodiments of the disclosure.

FIG. 5 is a diagram 500 illustrating a method for transmitting presence information about an electronic device 510 according to various embodiments of the disclosure.

Referring to FIG. 5, the electronic device 510 (e.g., the external electronic device 330 of FIG. 3) (e.g., the processor 240) may detect a VR mode activation state.

In an embodiment, the electronic device 510 may detect whether a VR device 520 (e.g., the VR device 251 of FIG. 2B) is connected (e.g., mounted) (e.g., plug-in or plug-out). For example, the electronic device 510 (e.g., the processor 240) may detect connection (550) of an external electronic device, for example, the VR device 520, to a connector (e.g., the connector 230 in FIG. 2A) (e.g., the USB connector 231 or the HDMI connector 233) as the VR mode activation state. In an embodiment, when the VR device 520 is connected (550), the electronic device 510 may perform control to operate (e.g., drive a VR application and a VR framework) in a mode (e.g., VR mode) suitable for the connected VR device 520. For example, the VR mode may include a mode of generating an image by dividing one image display on a screen into two images (e.g., a left image and a right image), rendering the two images, and performing inverse distortion on a planar image according to characteristics of a lens (e.g., a VR lens) included in the VR device 520 in order to prevent the image from being distorted by the lens.

Although it is detected as the VR mode activation state that the VR device 520 is connected in an embodiment, the disclosure is not limited thereto and the electronic device 510 (e.g., the processor 240) may detect a state in which a user wears the VR device 520 in which the electronic device 510 is mounted or a state in which a screen is rendered in a 3D VR mode as the VR mode activation state.

For example, after the VR device 520 is connected (550), the electronic device 510 (e.g., the processor 240) may detect whether the user wears the VR device 520 in which the electronic device 510 is mounted (e.g., mount or unmount).

In an embodiment, the electronic device 510 (e.g., the processor 240) may detect whether the VR device 520 is worn through a sensor circuit (e.g., the sensor circuit 220 of FIG. 2A) (e.g., a proximity sensor, an illuminance sensor, a magnetic sensor, or the like). For example, the electronic device 510 (e.g., the processor 240) may detect whether the VR device 520 is worn based on at least one of IR recognition, pressure recognition, and a variance in capacitance (or permittivity) according to wearing of the VR device 520.

In an embodiment, the electronic device 510 (e.g., the processor 240) may detect a state in which a screen is rendered in the 3D VR mode and is output to the display. The 3D VR mode may include a mode in which a screen is divided into areas corresponding to right and left eyes and a 3D screen corresponding to each eye is rendered.

In an embodiment, when the VR mode activation state is detected, the electronic device 510 (e.g., the processor 240) may transmit (560) presence information, for example, information on the VR mode activation state, to an IMS server 530 (e.g., the IMS server 320 of FIG. 3). In an embodiment, the electronic device 510 (e.g., the processor 240) may transmit (560) identification information (e.g., a phone number) about the electronic device 510 along with the presence information to the IMS server 530 (e.g., using a PUBLISH message of the SIP).

Although an embodiment in which the presence information is transmitted to the IMS server 530 when the VR mode activation state is detected is described, the disclosure is not limited thereto and the electronic device 510 (e.g., the processor 240) may transmit information about a VR mode deactivation state to the IMS server 530. For example, the VR mode deactivation state may include at least one of a state in which a worn VR device 520 is taken off, a state in which the VR device 520 is disconnected, or a state in which output of a screen rendered in the 3D VR mode is stopped.

In an embodiment, the IMS server 530 may transmit (570) the presence information about the VR mode activation state received from the electronic device 510 to an external electronic device 540 (e.g., the electronic device 310 of FIG. 3) that has requested reception of (e.g., subscription to) the presence information about the electronic device 510 (e.g., using a PUBLISH message of the SIP).

In an embodiment, the IMS server 530 may transmit the presence information about the electronic device 510 only to an external electronic device in which the VR mode is activated among at least one external electronic device that has requested reception of the presence information about the electronic device 510.

Although not shown in FIG. 5 according to an embodiment, the electronic device 510 (e.g., the processor 240) may set whether to transmit the presence information to the IMS server 530. For example, when it is set to transmit the presence information, the electronic device 510 (e.g., the processor 240) may perform operation 560 described above. When it is set not to transmit the presence information, the electronic device 510 (e.g., the processor 240) may not transmit the presence information to the IMS server 530 even when the VR mode activation state is detected.

In an embodiment, when an input to select a contact to which the presence information is to be transmitted from a contact list is detected, the electronic device 510 (e.g., the processor 240) may transmit the presence information and identification information about the selected contact to the IMS server 530 so that the presence information is transmitted to the selected contact.

In an embodiment, when the user of the electronic device 510 does not want to transmit the presence information about the VR mode activation state, it is possible to set whether to transmit the presence information as described above, thus preventing the presence information from being transmitted to the external electronic device 540. In addition, it is possible to transmit the presence information only to a contact selected by the user of the electronic device 510, thus preventing the presence information from being transmitted to a contact that the user does not want.

Figure 6:
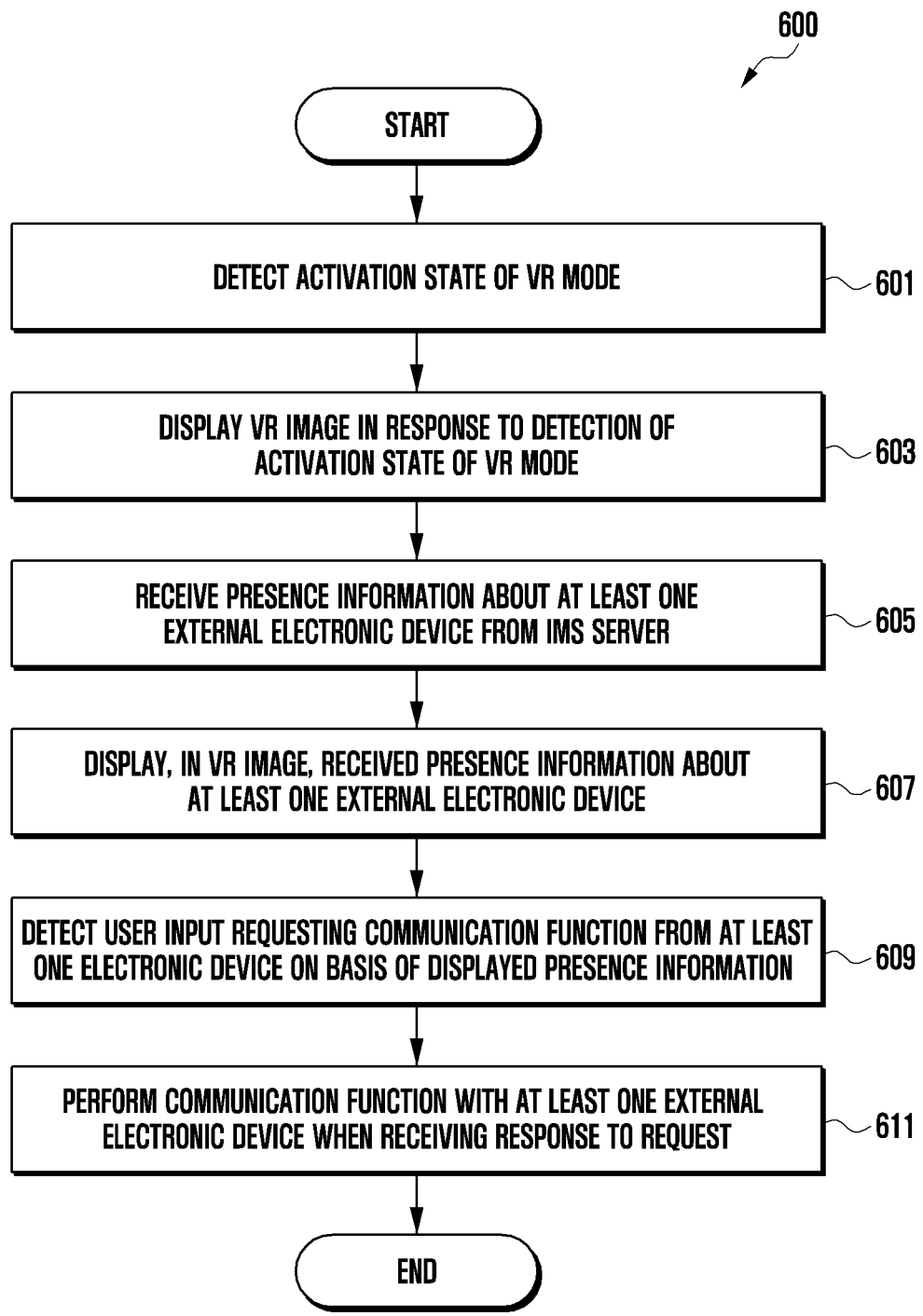
FIG. 6 is a flowchart illustrating a method for performing a function of communicating with an external electronic device in a VR mode according to various embodiments of the disclosure.

FIG. 6 is a flowchart 600 illustrating a method for performing a function of communicating with an external electronic device in a VR mode according to various embodiments of the disclosure.

Referring to FIG. 6, in operation 601, an electronic device (e.g., the electronic device 310 of FIG. 3) (e.g., the processor 240) may detect a VR mode activation state. For example, the VR mode activation state may include at least one of a state in which a VR device is connected, a state in which a user wears a VR device, or a state in which a screen is rendered in a 3D VR mode and is output to a display.

In an embodiment, operation 601 in which the electronic device detects the VR mode activation state is the same as operation 550 of FIG. 5, and thus a description thereof corresponds to a relevant description of FIG. 5.

In an embodiment, in operation 603, the electronic device (e.g., the processor 240) may display a VR image upon detecting the VR mode activation state. For example, the VR image may include at least one of a see-through image providing augmented reality (AR) or a see-closed image providing virtual reality (VR) through a display (e.g., the display 237 of FIG. 2A).

In an embodiment, the VR image may be expressed by dividing one image into two images (e.g., a left image and a right image).

In an embodiment, since the VR image may be distorted by a lens provided in the VR device, inverse distortion may be performed on a planar image according to characteristics of the lens in order to provide an undistorted image to the user.

In an embodiment, in operation 605, the electronic device (e.g., the processor 240) may receive presence information about at least one external electronic device from an IMS server (e.g., the IMS server 320 of FIG. 3).

In various embodiments, the presence information about the at least one external electronic device in operation 605 has been described as being received upon detecting the VR mode activation state in operation 603, but the disclosure is not limited thereto. The presence information about the at least one external electronic device in operation 605 may be received in advance from the IMS server.

In an embodiment, it is possible to subscribe to the presence information about the at least one external electronic device through operation 340 and operation 350 of FIG. 3, and the presence information about the at least one external electronic device according to the subscription may be received from the IMS server.

In an embodiment, in operation 607, the electronic device (e.g., the processor 240 or a VR application) may display the received presence information on the VR image. The presence information may include information about a VR mode activation state of the external electronic device, for example, whether the user wears the VR device.

Operation 607 according to various embodiments will be described with reference to FIG. 7A and FIG. 7B.

In an embodiment, in operation 609, the electronic device (e.g., the processor 240) may detect a user input to request a communication function from the at least one external device based on the displayed presence information. For example, the communication function may include at least one of a video call or a game.

In an embodiment, in operation 611, when a response to the user input to request the communication function is received, the electronic device (e.g., the processor 240) may perform a function of communicating with the at least one external electronic device.

Operation 609 and operation 611 according to various embodiments will be described with reference to FIG. 9.

Figure 7A:
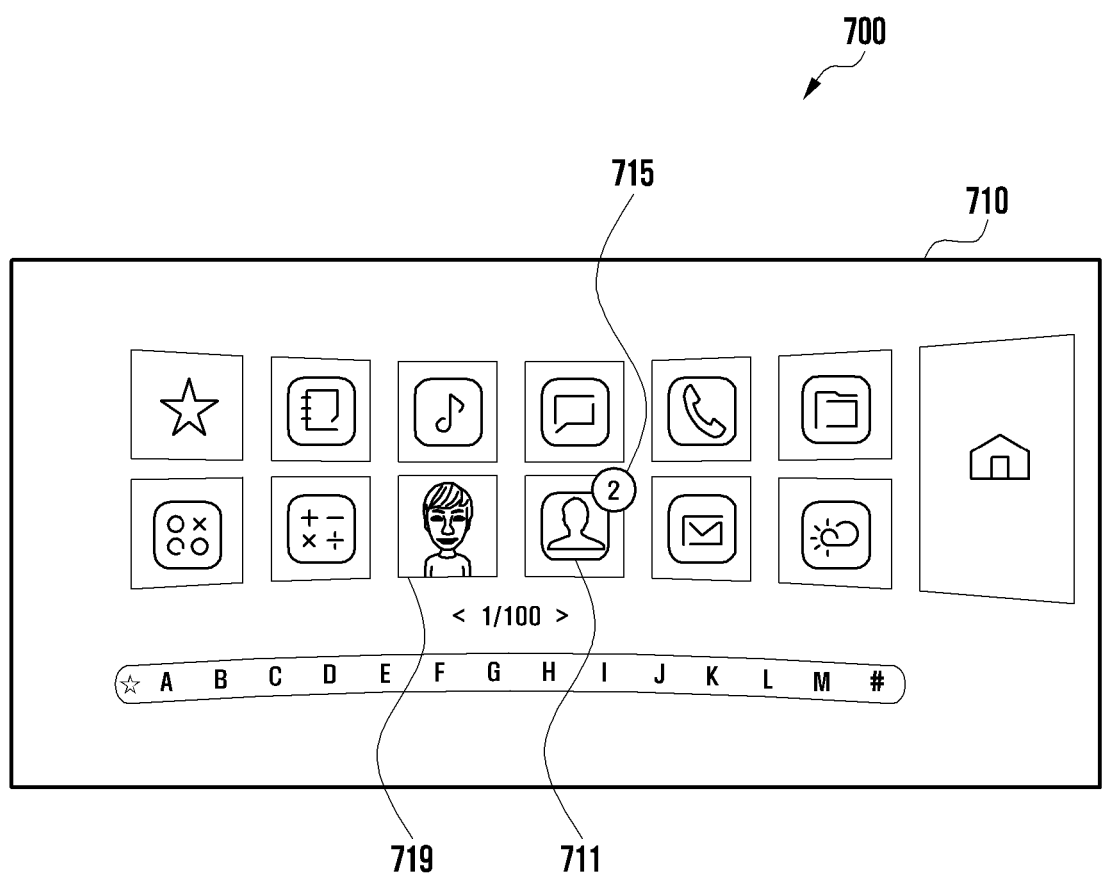
FIG. 7A and FIG. 7B are diagrams illustrating a method for displaying presence information about at least one external electronic device in a VR mode according to various embodiments of the disclosure.
Figure 7B:
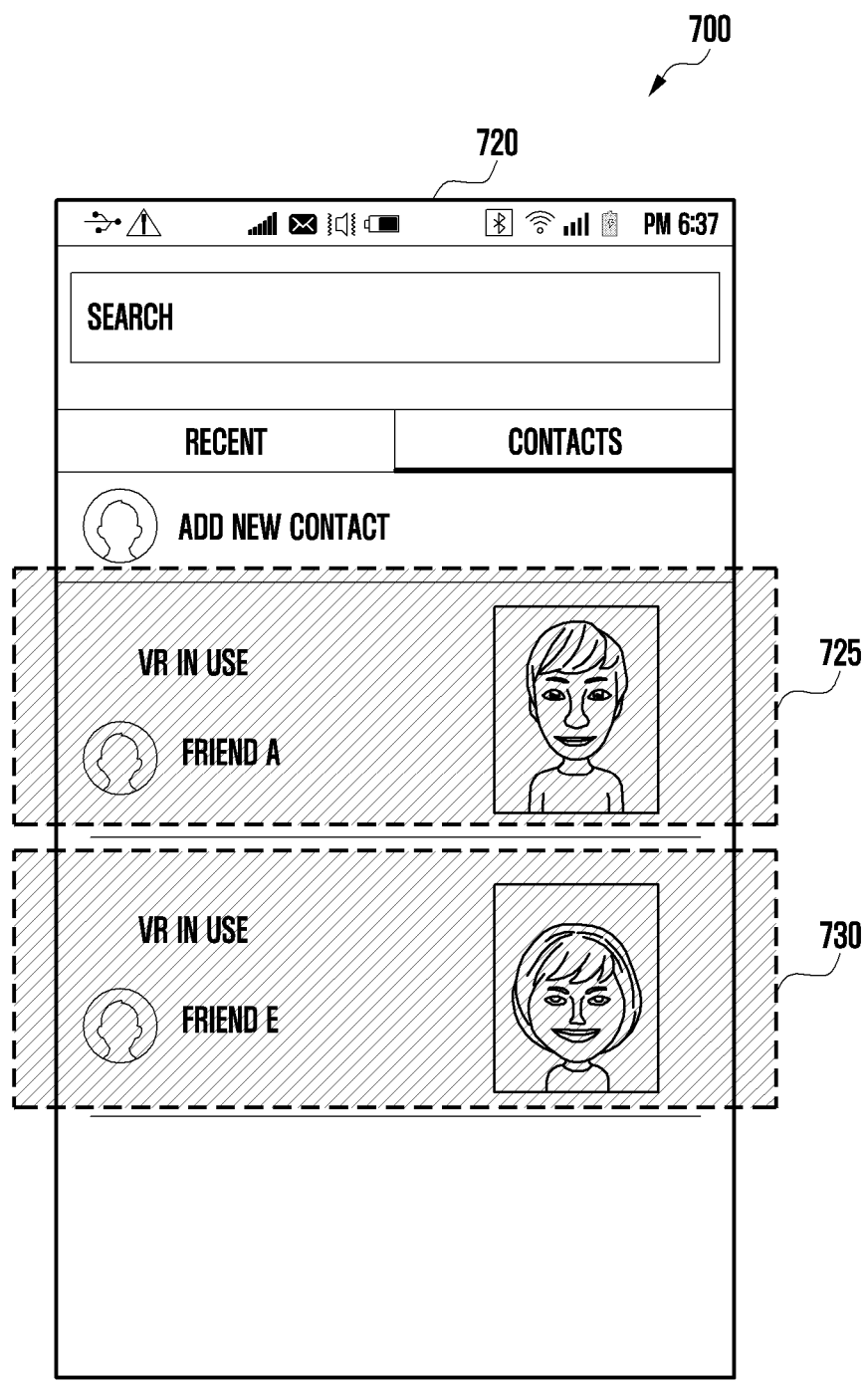

FIG. 7A and FIG. 7B are diagrams 700 illustrating a method for displaying presence information about at least one external electronic device in a VR mode according to various embodiments of the disclosure.

Referring to FIG. 7A, an electronic device (e.g., the electronic device 310 of FIG. 3) (e.g., the processor 240 or a VR application) may display a VR image 710 on a display (e.g., the display 237 of FIG. 2) in response to a VR mode activation state, for example, a state of being connected to (e.g., mounted in) a VR device (e.g., the VR device 251 of FIG. 2B) and/or a user wearing the VR device in which the electronic device is mounted.

In an embodiment, the electronic device (e.g., the processor 240 or the VR application) may display presence information about at least one external electronic device, received from an IMS server (e.g., the IMS server 320 of FIG. 3), on the VR image 710. The presence information may include information about a VR mode activation state of the at least one external electronic device.

In the following embodiments, it is assumed that the information about the VR mode activation state is information about a state in which the VR device is worn.

For example, the presence information may display the number (e.g., two) of contact counterparts wearing a VR device as a badge 715 on a contact application icon 711. The disclosure is not limited to this example, and a 3D avatar 719 representing the user wearing the VR device may be displayed on the VR image 710 according to a method for displaying the presence information.

Referring to FIG. 7B, when a user input to select the contact application icon 711 is detected, the electronic device (e.g., the processor 240 or the VR application) may display a contact application execution screen 720 including at least one contact. For example, the electronic device (e.g., the processor 240) may display the contact application execution screen 720 including only a contact (e.g., friend A and friend E) 725 and 730 wearing a VR device among the at least one contact. The disclosure is not limited to this example, and the electronic device (e.g., the processor 240 or the VR application) may apply a visual effect (e.g., slashes in a top right-to-bottom left direction) to the contact 725 and 730 (e.g., friend A and friend E) wearing the VR device among the at least one contact, thereby displaying the contact application execution screen such that the contact wearing the VR device is distinguished from a contact not wearing the VR device.

In an embodiment, a contact application may be a 2D application. When the contact application, which is the 2D application, is executed during display of the VR image, the electronic device (e.g., the processor 240 or the VR application) may display the VR image to include the contact application execution screen 720. In an embodiment, the electronic device (e.g., the processor 240 or the VR application) may display a visual effect indicating the state in which the VR device is worn adjacently to the contact 725 and 730 (e.g., friend A and friend E) wearing the VR device among the at least one contact included in the contact application execution screen 720 within the VR image In an embodiment, the electronic device (e.g., the processor 240 or the VR application) may display state information adjacently to the contact wearing the VR device. For example, the state information may include at least one of "VR in Use" and "VR in Use or Do Not Disturb".

In an embodiment, although not shown in FIG. 7A and FIG. 7B, the electronic device (e.g., the processor 240 or the VR application) may provide information about the contact wearing the VR device via a notification. For example, when receiving presence information about the state in which the VR device is worn from the IMS server (e.g., the IMS server 245 of FIG. 2A), the electronic device (e.g., the processor 240 or the VR application) may provide the presence information via a pop-up window or in the form of a 3D avatar as a character for the contact. In an embodiment, the notification may be rendered and provided in the VR image.

FIG. 8 is a flowchart 800 illustrating a method for transmitting presence information about an electronic device according to various embodiments of the disclosure.

Referring to FIG. 8, in operation 801, the electronic device (e.g., the external electronic device 330 of FIG. 3) may detect a VR mode activation state. For example, the VR mode activation state may include at least one of a state in which a VR device (e.g., the VR device 251 of FIG. 2B) is connected, a state in which a user wears the VR device, or a state in which a screen is rendered in a 3D VR mode and is output to a display.

In an embodiment, in operation 803, the electronic device may display a VR image upon detecting the VR mode activation state.

In an embodiment, operation 801 and operation 803 are the same as operation 601 and operation 603 of FIG. 6, and thus a description thereof corresponds to a relevant description of FIG. 6.

In an embodiment, in operation 805, the electronic device may transmit presence information about the electronic device to an IMS server (e.g., the IMS server 245 of FIG. 2A). For example, the presence information may include information about the VR mode activation state of the electronic device.

In an embodiment, the electronic device may transmit identification information (e.g., a phone number) about the electronic device along with the presence information to the IMS server.

In an embodiment, in operation 807, the electronic device may receive a request associated with a communication function from an external electronic device (e.g., the electronic device 310 of FIG. 3). For example, the communication function may include a video call, a game, or the like.

In an embodiment, in operation 809, the electronic device may transmit a response signal to the received request associated with the communication function and may perform a function of communicating with the external electronic device. For example, when detecting a user input to accept the received request associated with the communication function, the electronic device may transmit a signal for accepting the request to the external electronic device.

In an embodiment, the electronic device may transmit data necessary to perform the communication function along with the signal for accepting the received request. For example, the data may include geometry, material, and motion information about an object (e.g., a 3D avatar) representing the electronic device.

In various embodiments, operation 807 and operation 809 described above may be omitted.

Although not shown in FIG. 8 according to an embodiment, when detecting a VR mode deactivation state, for example, a state in which a user wearing the VR device takes off the VR device, a state in which the VR device is disconnected from the electronic device, or a state in which output of a screen rendered in the 3D VR mode is stopped, the electronic device (e.g., the processor 240) may transmit information about the VR mode deactivation state to the IMS server.

FIG. 9 is a flowchart 900 illustrating a method for performing a function of communicating with an external electronic device in a VR mode according to various embodiments of the disclosure.

According to an embodiment, FIG. 9 illustrates a specific operation of operation 611 of FIG. 6 and operation 809 of FIG. 8 in which the function of communicating with the external electronic device is performed.

In the following embodiment, it is assumed that the communication function is a video call.

Referring to FIG. 9, when receiving a response signal to a signal for requesting a video call from an external electronic device (e.g., the external electronic device 330 or the electronic device 310 of FIG. 3), an electronic device (e.g., the electronic device 310 or the external electronic device 330 of FIG. 3) (e.g., the processor 240) may render an object representing the electronic device in a VR image and may transmit the rendered VR image to the external electronic device in order to perform a video call with the external electronic device in operation 901.

In an embodiment, the electronic device (e.g., the processor 240) may further transmit at least one of geometry, material, and motion information about the object (e.g., a 3D avatar) representing the electronic device to the external electronic device.

In an embodiment, in operation 903, the electronic device (e.g., the processor 240) may receive 3D modeling information about an object representing the external electronic device from the external electronic device. In an embodiment, the electronic device (e.g., the processor 240) may further receive context information about the external electronic device from the external electronic device. For example, the context information may include position information about the external electronic device and voice information about a user of the external electronic device. In an embodiment, the electronic device (e.g., the processor 240) may receive information about a VR mode change. For example, the information about the VR mode change may include at least one of a state in which a worn VR device (e.g., the VR device 251 of FIG. 2B) is taken off or a state in which the VR device is disconnected.

In an embodiment, in operation 905, the electronic device (e.g., the processor 240 or the VR application) may render and display the object representing the external electronic device in the VR image based on the received 3D modeling information. For example, the object representing the external electronic device is assumed to be a 3D avatar.

In an embodiment, the electronic device (e.g., the processor 240 or the VR application) may display the 3D avatar representing the external electronic device in the VR image based on at least one of geometry, material, or motion information about the 3D avatar representing the external electronic device.

In an embodiment, the electronic device (e.g., the processor 240 or the VR application) may render and display the object representing the external electronic device in the VR image based on the context information about the external electronic device.

In an embodiment, the external electronic device may obtain position information about the user of the external electronic device in a space through a microphone (e.g., a 3D microphone) that recognizes spatial information and may transmit the obtained position information to the electronic device.

In an embodiment, when a plurality of users speaks through a speaker phone, for example, each of the plurality of users may speak at a different position. In this case, the external electronic device may analyze the voices of the plurality of users to obtain position information about each of the plurality of users in a space and may transmit the position information about each user to the electronic device.

In an embodiment, the electronic device (e.g., the processor 240) may determine (e.g., change) the position of the object representing the external electronic device in the VR image based on the position information about the user of the external electronic device received from the external electronic device. The electronic device (e.g., the processor 240 or the VR application) may render and display the object representing the external electronic device in the VR image based on the determined position.

In an embodiment, the position of the object representing the external electronic device may be changed in the VR image in real time. For example, the electronic device (e.g., the processor 240) may analyze a voice signal of the user, thereby detecting that the volume of the voice signal gradually increases (e.g., the user approaches the microphone) or detecting that the volume gradually decreases (e.g., the user may move away from the microphone). The electronic device (e.g., the processor 240 or the VR application) may render the position of the object representing the external electronic device to be expressed as a motion of walking closer or a motion of walking away in the VR image based on the volume of the voice signal.

In an embodiment, the electronic device (e.g., the processor 240) may determine an emotional state of the user of the external electronic device by analyzing the voice signal of the user. For example, when it is detected that the voice of the user increases in volume, for example, when the frequency or amplitude of the voice signal increases, the electronic device (e.g., the processor 240) may determine that the user is in an angry state or an excited state. The electronic device (e.g., the processor 240 or VR application) may apply a predefined animation for information about the angry state or the excited state to the object representing the external electronic device and may render and display the object in the VR image. The emotional state may further include a happy state, a drowsy state, a bored state, or the like.

In an embodiment, the electronic device (e.g., the processor 240) may analyze the user's utterance (e.g., a word or sentence) and may determine a motion of the user based on the utterance. For example, when the user's utterance, for example, "Hello" or "I love you," is recognized, the electronic device (e.g., the processor 240 or the VR application) may apply an animation of a predefined motion for the "Hello" or "I love you" to the object representing the external electronic device and may render and display the object in the VR image.

In an embodiment, when a VR mode change (a state in which the worn VR device is taken off and/or a state in which the VR device is disconnected) is detected, the electronic device (e.g., the processor 240 or the VR application) may replace the object, for example, the 3D avatar, representing the external electronic device displayed in the VR image with an object (e.g., an item or avatar) corresponding to VR mode deactivation and may display the object.

In an embodiment, in operation 907, the electronic device (e.g., the processor 240) may perform a function of communicating with the object representing the external electronic device. For example, the user of the electronic device may perform a video call with the object, for example, the 3D avatar, representing the external electronic device displayed in the VR image.

In an embodiment, the VR image may include at least one virtual item in at least a portion. The electronic device (e.g., the processor 240) may perform an interaction for controlling the at least one virtual item with the 3D avatar representing the external electronic device during the video call.

Figure 10:
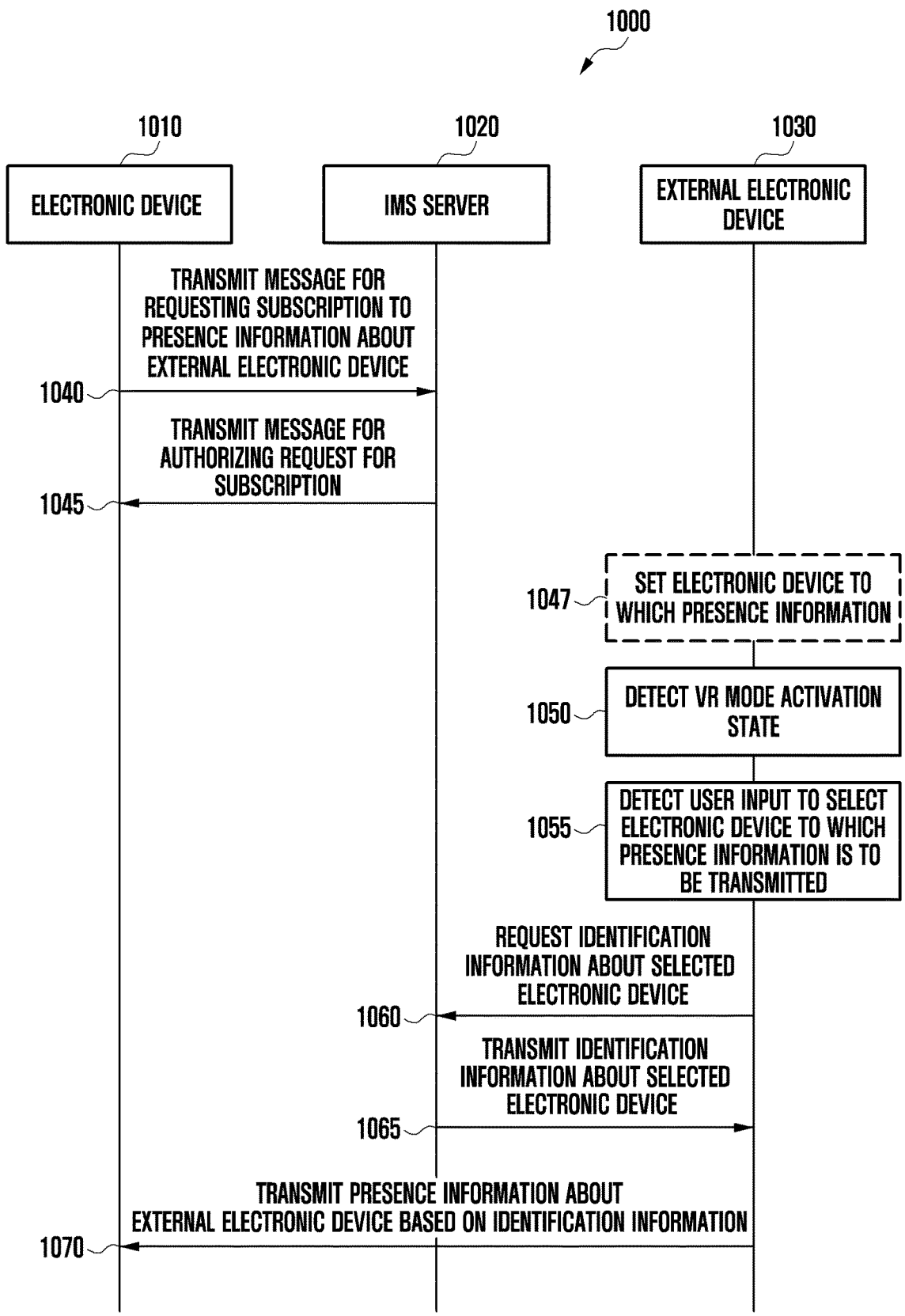
FIG. 10 is a diagram illustrating signal flow between an electronic device, an IMS server, and an external electronic device according to various embodiments of the disclosure.

FIG. 10 is a diagram 1000 illustrating signal flow between an electronic device 1010, an IMS server 1020, and an external electronic device 1030 according to various embodiments of the disclosure.

According to an embodiment, operation 1040 to operation 1050 of FIG. 10 are the same as operation 340 to operation 350 of FIG. 3 described above, and thus a description thereof corresponds to a relevant description of FIG. 3. In FIG. 10, only operations different from those of FIG. 3 will be described.

Referring to FIG. 10, when a VR mode activation state is detected (e.g., when connection of a VR device (e.g., the VR device 251 of FIG. 2B) is detected, when wearing of the VR device is detected, or when a state in which a screen is rendered in a 3D VR mode and is output to a display is detected) in operation 1050, the external electronic device 1030 (e.g., the external electronic device 330 of FIG. 3) may detect a user input to select an electronic device to which presence information is transmitted (e.g., published) in operation 1055.

For example, the external electronic device 1030 may display a contact list including at least one contact upon executing an application associated with a contact. The external electronic device 1030 may select at least one contact to which the presence information about the external electronic device 1030 is to be transmitted from the displayed contact list.

In an embodiment, in operation 1060, the external electronic device 1030 may request identification information about an electronic device (e.g., the selected contact), for example, the electronic device 1010, selected by a user from an IMS server 1020. For example, the identification information may include at least one of a user ID, a phone number, an email address, and an IP address.

In an embodiment, before operation 1050, the external electronic device 1030 may set an electronic device to which the presence information is to be transmitted in operation 1047. For example, the external electronic device 1030 may execute the application associated with the contact in order to set a contact to which the presence information, for example, the VR mode activation state (e.g., a state in which the VR device is connected, a state in which the user wears the VR device, or a state in which a screen is rendered in the 3D VR mode and is output to the display), about the external electronic device 1030 is to be transmitted. The external electronic device 1030 may display the contact list including the at least one contact on the display (e.g., the display 237 of FIG. 2A) upon the execution. When a user input to select at least one contact from the contact list is detected, the external electronic device 1030 may set the at least one selected contact as a contact to which the VR mode activation state of the external electronic device 1030 is to be transmitted.

In an embodiment, when the at least one contact is set as the contact to which the VR mode activation state is to be transmitted in operation 1047 and the VR mode activation state is detected in operation 1050, operation 1055 may be omitted and operation 1060 of requesting the identification information about the at least one set contact from the IMS server 1020 may be performed.

In an embodiment, in operation 1065, the IMS server 1020 may transmit the identification information (e.g., an IP address) about the electronic device 1010 requested by the external electronic device 1030.

In an embodiment, the IMS server 1020 may store information about at least one registered electronic device (e.g., the electronic device 1010 and the external electronic device 1030), for example, at least one of a user ID, a phone number, and an email address of the at least one electronic device. The IMS server 1020 may transmit the identification information about the electronic device 1010 requested by the external electronic device 1030 based on the information about the at least one electronic device.

In an embodiment, in operation 1070, the external electronic device 1030 may transmit the presence information about the external electronic device 1030 to the electronic device 1010 based on the identification information received from the IMS server 1020. For example, the external electronic device 1030 may directly transmit presence information, for example, information about the VR mode activation state, about the electronic device corresponding to the IP address using the identification information, for example, the IP address, about the at least one electronic device received from the IMS server 1020 through a SIM PUBLISH method.

In an embodiment, it is possible to directly transmit the information about the VR mode activation state of the at least one electronic device using the IP address of the at least one electronic device, thus not needing an additional operation of the IMS server 1020.

In an embodiment, it is possible to transmit the information about the VR mode activation state only to a specific contact selected by the user rather than at least one electronic device requesting subscription to the information about the VR mode activation state, thus preventing an increase in loads of the electronic device.

In various embodiments, operation 1047 and operation 1055 described above may be omitted.

Figure 11:
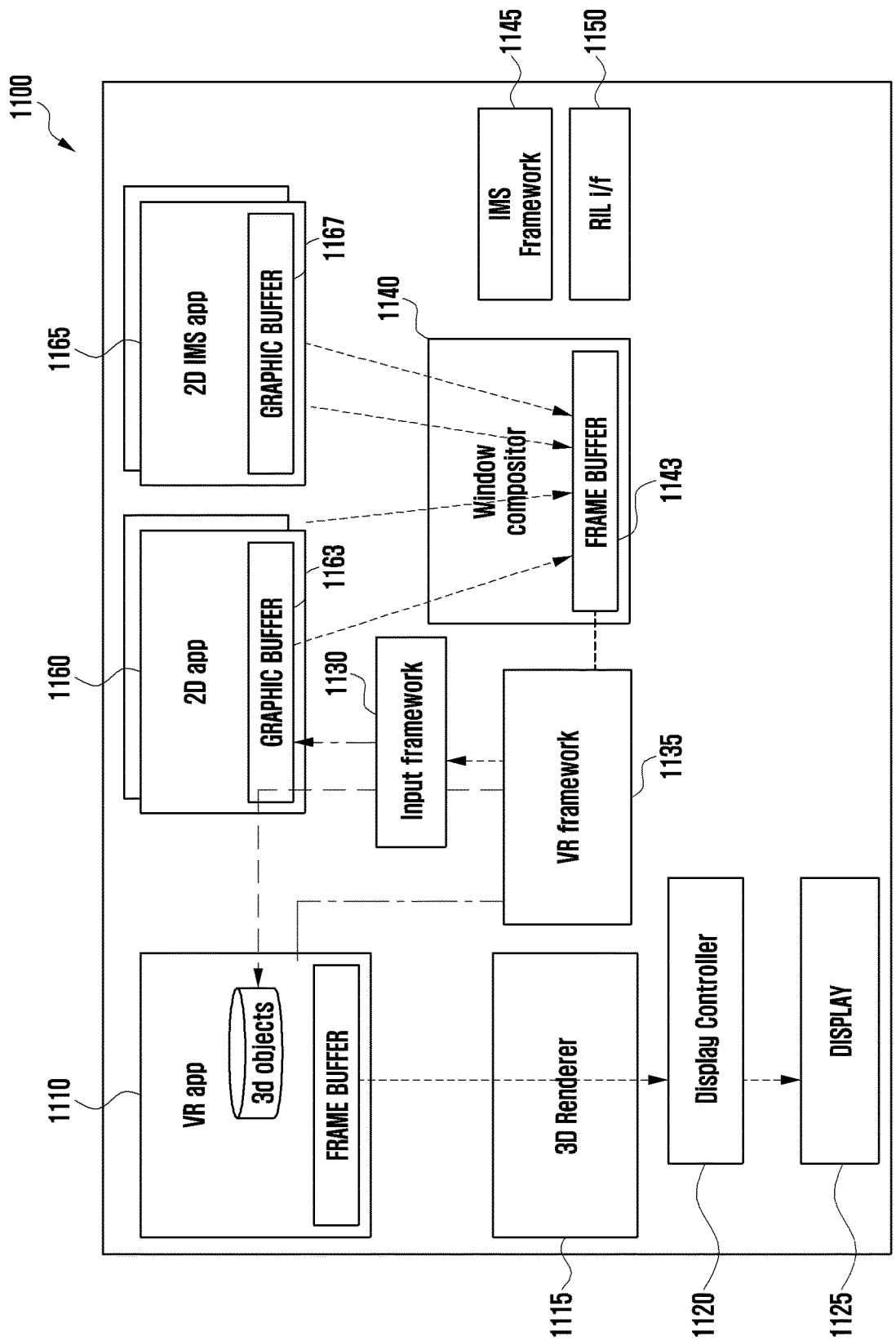
FIG. 11 is a block diagram illustrating a method for rendering a screen to be displayed in VR according to various embodiments of the disclosure.

FIG. 11 is a block diagram 1100 illustrating a method for rendering a screen to be displayed in VR according to various embodiments of the disclosure.

Referring to FIG. 11, an electronic device (e.g., the electronic device 310 of FIG. 3) (e.g., the processor 240) may drive a VR framework 1135 to control a function associated with an operation of the electronic device based on a rendered VR image in response to a VR mode activation state, for example, connection or wearing of a VR device (e.g., the VR device 251 of FIG. 2B). In an embodiment, the electronic device (e.g., the processor 240) may execute a VR application (VR app) 1110 before the VR mode activation state is detected.

In an embodiment, the electronic device (e.g., a 3D application 1110) may transmit a VR image in which one image is divided into two images (e.g., a left image and a right image) by a 3D renderer 1115 to a display controller 1120 in response to the VR mode activation state. The divided VR image may be output to a display 1125 by the display controller 1120.

In an embodiment, the display controller 1120 and the display 1125 may be provided in an external electronic device, and the electronic device (e.g., the 3D application 1110) may output a VR image in which one image is divided into two images (e.g., a left image and a right image) by the 3D renderer 1115 to the display of the external electronic device through the display controller 1120 of the external electronic device in response to the VR mode activation state.

In various embodiments, the electronic device (e.g., the processor 240) may obtain an image of a current space captured by at least one camera (not shown). The 3D renderer 1115 of the electronic device may render the obtained image of the current space in the VR image. The rendered image may be output to the display 1125 through the display controller 1120.

In an embodiment, the IMS framework 1145 may get and/or receive presence information about a VR mode activation state of the external electronic device, for example, a state in which the VR device is worn, from the external electronic device from an IMS server (e.g., the IMS server of 320 FIG. 3).

In an embodiment, the 3D renderer 1115 may render the VR image to include an object representing the external electronic device based on the presence information received through a VR framework 1135. For example, the 3D renderer 1115 may render the VR image to include the object representing the external electronic device using an open graphics library (OpenGL) and/or a graphic processing unit (GPU). The rendered image may be output to the display 1125 through a display controller 1120.

In an embodiment, a radio interface layer interface (RIL i/f) 1150 of the electronic device may provide a connection for communication with the external electronic device (e.g., the external electronic device 330 of FIG. 3). In an embodiment, the electronic device (e.g., an application 146 and middleware 144) may communicate with a communication module (e.g., the communication module 190 or modem) through the RIL interface (RIL i/f) 1150 and may transmit and receive data according to a request for a connection for communication from the electronic device to and from the external electronic device. For example, the data may be data for performing a communication function (e.g., a video call function) between the electronic device and the external electronic device, for example, geometry, material, and motion information about objects (e.g., 3D avatars) representing the electronic device and the external electronic device.

In an embodiment, the electronic device (e.g., the processor 240) may execute a 2D application (2D app) 1160 or a 2D IMS application (2D IMS app) 1165 during the execution of the VR application 1110. The electronic device (e.g., the processor 240) may generate screens (e.g., surfaces) of the 2D application 1160 or the 2D IMS application 1165. Each of the generated surfaces may include a plurality of surfaces, and the plurality of surfaces may be stored in graphic buffers 1163 and 1167. The surfaces of the 2D application 1160 and 2D IMS application 1165 stored in the graphic buffers 1163 and 1167 may be forwarded to a frame buffer 1143 of a window compositor 1140. The window compositor 1140 may compose the plurality of surfaces of the 2D application 1160 or the 2D IMS app 1165 stored in the frame buffer 1143 into one surface. The VR application 1110 may read the one surface composed by the window compositor 1140 through the VR framework 1135.

In an embodiment, the VR application 1110 may render the VR image to include the composed one surface (e.g., using the 3D renderer 1115) and may output the VR image to the display 1125.

In an embodiment, the VR application 1110 may track a user's gaze through a gaze tracking unit (e.g., the gaze tracking unit 275 of FIG. 2B). In an embodiment, the VR application 1110 may receive a user's input (e.g., input of an object focus in the VR image) in the VR image through an input device (e.g., the input device 260 of FIG. 2B).

In an embodiment, the VR framework 1135 may provide the screen of the 2D application 1160 (or the 2D IMS application 1165) to the VR application 1110. In an embodiment, the VR framework 1135 may convert user input information (e.g., information about the position of the user's gaze in the VR image, information about a focused object, or the like) about the VR application 1110 into user input information (e.g., the coordinates of a touch and a touch event) corresponding to the 2D application 1160 and may forward the user input information to an input framework 1130. The input framework 1130 may forward the user input information received from the VR framework to the 2D application 1160 and the 2D IMS application 1165.

In an embodiment, the image rendered by the VR application 1110 may be transmitted to the display controller 1120 and may be displayed on the display 1125 through the display controller 1120.

In an embodiment, the 2D application 1160 (or the 2D IMS application 1165) may execute a function according to the received user's gaze information and/or user input. The electronic device may generate a screen (e.g., a surface) according to the executed function. Each generated surface may include a plurality of surfaces, and the plurality of surfaces may be stored in the graphic buffers 1163 and 1167. The surfaces of the 2D application 1160 and 2D IMS application 1165 stored in the graphic buffers 1163 and 1167 may be composed into one surface by the window compositor 1140. The window compositor 1140 may forward the composed one surface to the 3D application 1110 through the VR framework 1135. The 3D application 1110 may render the VR image to include the composed one surface. The 3D application 1110 may perform 2D rendering on a VR screen using the 3D renderer 1115. The rendered VR image based on the user's gaze information and/or user input may be output to the display 1125 by the display controller 1120.

In an embodiment, the VR application 1110, the 3D renderer 1115, the input framework 1130, the VR framework 1135, the window compositor 1140, the IMS framework 1145, the RIL interface (RIL i/f) 1150, the 2D application 1160 or the 2D IMS application 1165 may be included in a program (e.g., the program 140 of FIG. 1) operating in a processor (e.g., the processor 120 of FIG. 1).

Figure 12:
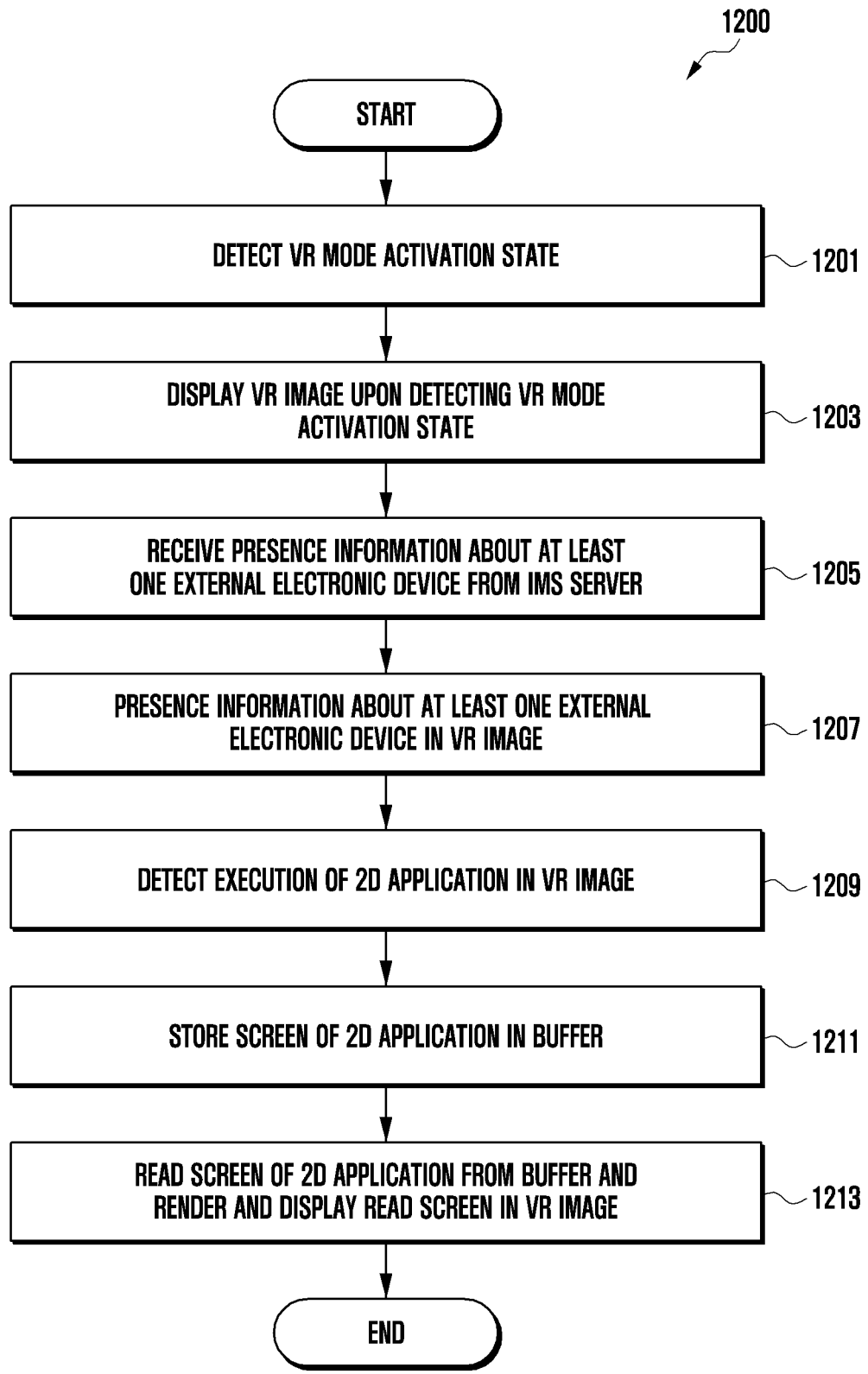
FIG. 12 is a flowchart illustrating a method for rendering a 2D application screen according to various embodiments of the disclosure.

FIG. 12 is a flowchart 1200 illustrating a method for rendering a 2D application screen according to various embodiments of the disclosure.

Operation 1201 to operation 1207 of FIG. 12 according to an embodiment are the same as operation 601 to operation 607 of FIG. 6 described above, and thus a description thereof corresponds to a relevant description of FIG. 6. In FIG. 12, only operations different from those of FIG. 6 will be described.

Referring to FIG. 12, in operation 1209, an electronic device (e.g., the electronic device 310 of FIG. 3) may execute a 2D application (e.g., the 2D application 1160 or the 2D IMS application 1165 of FIG. 11) in a VR image displayed by executing a VR application (e.g., the VR application 1110 of FIG. 11).

In an embodiment, in operation 1211, the electronic device may store a screen of the 2D application executed in the VR image included in the VR application 1110 in a buffer (e.g., included in the memory 130). For example, when the 2D application is executed, the electronic device may generate the screen (e.g., a surface) of the 2D application. The electronic device may store the generated screen of the 2D application in the buffer (e.g., a graphic buffer (e.g., the graphic buffers 1163 and 1167 of FIG. 11)) in the memory 130 and may transmit the generated screen to a virtual frame buffer (e.g., 1143 of FIG. 11).

In an embodiment, in operation 1213, the electronic device (e.g., the VR application 1110) may read the screen of the 2D application from the buffer (e.g., the frame buffer 1143 of FIG. 11) and may render and display the read screen in the VR image. For example, the electronic device may render the screen read from the buffer by texture streaming and/or texture mapping to the VR image through a 3D renderer (e.g., the 3D renderer 1115 of FIG. 11). The electronic device may control a function associated with the operation of the electronic device based on the VR image in which the screen of the 2D application (e.g., the 2D application 1160 of FIG. 11) (or a 2D IMS application (e.g., the 2D IMS application 1165 of FIG. 11)) is rendered through a VR framework (e.g., the VR framework 1135 of FIG. 11).

In an embodiment, the electronic device may track a user's gaze through a gaze tracking unit (e.g., the gaze tracking unit 275 of FIG. 2B). The electronic device (e.g., the VR application 1110) may render and display a VR image of an area corresponding to the user's gaze based on the tracked user's gaze. According to various embodiments, when the area corresponding to the user's gaze in the VR image of the VR application 1110 is an area representing the 2D application 1160 (e.g., the 2D IMS application 1165, such as a contact application or a phone application), the electronic device (e.g., the VR application 1110) may further display presence information received from at least one external electronic device 330 in the VR image. For example, when the user gazes at a list of contact applications, the electronic device (e.g., the VR application 1110) may further display the number (e.g., two) of one or more external electronic devices 330 with the VR mode activated in the VR image. In an embodiment, the electronic device may receive a user input detected from a VR device (e.g., the VR device 251 of FIG. 2B). For example, the electronic device may receive a signal of at least one of a touch input and a button input detected by an input device (e.g., the input device 260 of FIG. 2B) of the VR device from the VR device. The electronic device may convert the received signal into at least one of a touch input, a key input, and a gesture corresponding to the input and may render a screen for a function performed by the received input in the VR image through the 3D renderer 1115.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
an internet protocol (IP) multimedia subsystem (IMS) framework configured to communicate with an IMS server;
a display;
memory; and
a processor, wherein the processor is configured to:
control the display to display a virtual reality (VR) image in response to a VR mode activation state,
receive presence information for the VR mode activation state of at least one external electronic device from the IMS server, wherein the presence information for the VR mode activation state includes information on a state in which a user of the at least one external electronic device uses a VR device,
render, based on the received presence information, the VR image to include at least one object representing the at least one external electronic device of which the VR mode is activated,
control the display to display the rendered VR image, and
perform, based on selecting an object among the at least one object included in the rendered VR image, a communication function with an external electronic device corresponding to the selected object.

2. The electronic device of claim 1, wherein the VR mode activation state comprises at least one of a state in which a VR device is connected to the electronic device, a state in which a user wears the VR device, or a state in which a screen is rendered in a three dimensional (3D) VR mode and is output to the display.

3. The electronic device of claim 1, wherein the processor is configured to display the VR mode activation state of the at least one external electronic device as an icon in the VR image, or display the rendered VR image by applying a visual effect to a contact in which a VR mode is activated among at least one contact included in a contact list displayed according to execution of an application associated with a contact.

4. The electronic device of claim 1, wherein the processor is configured to:
render the VR image to include presence information for a VR mode deactivation state using a 3D application upon receiving the presence information for the VR mode deactivation state of the at least one external electronic device from the IMS server, and
control the display to display the rendered VR image including the presence information for the VR mode deactivation state,
wherein the VR mode deactivation state comprises at least one of a state in which a VR device is disconnected, a state in which it is detected that a user wearing the VR device takes off the VR device, or a state in which output of a screen rendered in a 3D VR mode is stopped.

5. The electronic device of claim 1, wherein the processor is configured to:
render the VR image to include at least one object using a 3D application,
store a screen of a 2D application in the memory when the 2D application is executed during execution of a 3D application,
read the screen of the 2D application from the memory using the 3D application and control the display to render and display the VR image to include the read screen, and
control the display to distinguishably display an electronic device in the VR mode activation state and an electronic device in a VR mode deactivation state.

6. The electronic device of claim 1, wherein the processor is configured to:
obtain gaze information of a user of the electronic device and control the display to render and display a portion of the VR image corresponding to the obtained gaze information, or
control the display to render and display the VR image to include a screen of a function corresponding to a received user input when receiving a user input detected by a VR device.

7. The electronic device of claim 1, wherein the processor is configured to:
transmit a message for a request for subscription to the presence information for the at least one external electronic device to the IMS server, and
receive a message for authorizing the request for the subscription from the IMS server.

8. The electronic device of claim 1, wherein the processor is configured to:
transmit information for a VR mode activation state of the electronic device to the IMS server in response to the VR mode activation state, or
detect selection of at least one external electronic device to which presence information for the VR mode activation state of the electronic device is to be transmitted in response to the VR mode activation state, transmit a request for identification information of the selected at least one external electronic device to the IMS server, and transmit the presence information comprising the information for the VR mode activation state of the electronic device to the external electronic device corresponding to the received identification information upon receiving the identification information of the selected at least one external electronic device from the IMS server.

9. The electronic device of claim 1, wherein the processor is configured to transmit or receive the presence information comprising the information for the VR mode activation state to or from the IMS server based on a session initiation protocol (SIP).

10. A method for providing information, by an electronic device, in virtual reality, the method comprising:
    displaying a virtual reality (VR) image on a display in response to a VR mode activation state;
    receiving presence information for the VR mode activation state of at least one external electronic device from an IMS server, wherein the presence information for the VR mode activation state includes information on a state in which a user of the at least one external electronic device is using a VR device;
    rendering, based on the received presence information, the VR image to include at least one object representing the at least one external electronic device of which the VR mode is activated;
    displaying the rendered VR image; and
    performing, based on selecting an object among the at least one object included in the rendered VR image, a communication function with an external electronic device corresponding to the selected object.

11. The method of claim 10, wherein the displaying of the rendered VR image comprises at least one of:
    displaying the VR mode activation state of at least external electronic device as an icon in the VR image; or
    displaying the VR image by applying a visual effect to a contact in which a VR mode is activated among at least one contact included in a contact list displayed according to execution of an application associated with a contact.

12. The method of claim 10, further comprising:
    receiving presence information for a VR mode deactivation state of the at least one external electronic device from the IMS server;
    rendering the VR image to include the presence information for the VR mode deactivation state using a three dimensional (3D) application; and
    displaying the rendered VR image including the presence information for the VR mode deactivation state on the display.

13. The method of claim 10, further comprising:
    rendering the VR image to include at least one object using a 3D application;
    storing a screen of a 2D application in a memory when the 2D application is executed during execution of the 3D application;
    reading the screen of the 2D application from the memory using the 3D application and rendering and displaying the VR image to include the read screen on the display; and
    distinguishably displaying an electronic device in the VR mode activation state and an electronic device in a VR mode deactivation state.

14. The method of claim 10, further comprising:
    rendering and displaying a portion of the VR image corresponding to gaze information when obtaining the gaze information of a user of the electronic device; or
    rendering and displaying the VR image to include a screen of a function corresponding to a received user input when receiving the user input detected by a VR device.

15. The method of claim 10, further comprising:
    detecting selection of at least one external electronic device to which presence information for the VR mode activation state of the electronic device is to be transmitted in response to the VR mode activation state;
    transmitting a request for identification information of the selected at least one external electronic device to the IMS server;
    receiving the identification information of the selected at least one external electronic device from the IMS server; and
    transmitting the presence information including the information for the VR mode activation state of the electronic device to the external electronic device corresponding to the received identification information.

* * * * *